United States Patent [19]
Umeda et al.

[11] Patent Number: 5,963,194
[45] Date of Patent: Oct. 5, 1999

[54] APPARATUS FOR INCLINATION DETECTION AND INPUT APPARATUS USING THIS APPARATUS

[75] Inventors: Yuichi Umeda; Junichi Saito, both of Iwaki; Ichiro Morishita, Sendai; Masaru Nakayama, Natori; Arao Sato; Kazuhiro Katagiri, both of Sendai, all of Japan

[73] Assignee: Alps Electric Co. Ltd., Tokyo, Japan

[21] Appl. No.: 08/717,445

[22] Filed: Sep. 20, 1996

Related U.S. Application Data

[62] Division of application No. 08/342,536, Nov. 21, 1994.

[30] Foreign Application Priority Data

| Nov. 25, 1993 | [JP] | Japan | 5-317479 |
| Dec. 27, 1993 | [JP] | Japan | 5-350811 |
| Jul. 5, 1994 | [JP] | Japan | 6-175930 |
| Jul. 5, 1994 | [JP] | Japan | 6-175931 |

[51] Int. Cl.$^6$ .............................. G09G 5/08; H03K 7/08
[52] U.S. Cl. ........................................ 345/157; 375/238
[58] Field of Search ...................... 341/53, 68, 69, 341/73, 178, 179, 182, 183; 375/238, 239, 271, 272, 323, 273, 274, 282; 359/183, 184, 186, 278, 279; 345/157, 158, 163

[56] References Cited

U.S. PATENT DOCUMENTS

| 4,368,439 | 1/1983 | Shibuya et al. .................. 375/303 |
| 4,503,472 | 3/1985 | Lacher .............................. 375/282 |
| 4,565,999 | 1/1986 | King et al. . | |
| 4,627,078 | 12/1986 | Stoner ............................... 375/272 |
| 4,672,562 | 6/1987 | Egli et al. . | |
| 4,745,402 | 5/1988 | Auebach .......................... 345/158 |
| 4,817,115 | 3/1989 | Campo et al. .................... 375/238 |
| 4,988,981 | 1/1991 | Zimmerman et al. . | |
| 5,045,843 | 9/1991 | Hansen . | |
| 5,185,765 | 2/1993 | Walker ............................. 375/238 |
| 5,185,766 | 2/1993 | Ogasahara et al. ............. 345/157 |
| 5,227,622 | 7/1993 | Suzuki . | |
| 5,227,985 | 7/1993 | DeMenthon . | |
| 5,280,542 | 1/1994 | Ozeki et al. . | |
| 5,296,838 | 3/1994 | Suzuki . | |
| 5,297,061 | 3/1994 | Dementhon et al. . | |
| 5,435,573 | 7/1995 | Oakford . | |
| 5,510,893 | 4/1996 | Suzuki . | |
| 5,610,947 | 3/1997 | Balasubramanian et al. ... 375/282 |
| 5,623,518 | 4/1997 | Pfiffner ............................. 375/272 |
| 5,627,565 | 5/1997 | Morishita et al. .............. 345/158 |
| 5,642,380 | 6/1997 | Lambert .......................... 375/272 |

*Primary Examiner*—Jeffery Brier
*Assistant Examiner*—Paul A. Bell
*Attorney, Agent, or Firm*—Brinks Hofer Gilson & Lione

[57] ABSTRACT

An apparatus is disclosed for inclination detection wherein infrared transmitted signal, signal groups S1, S2, S3, . . . including a leader code, a parity bit and bits for data transfer are sequentially transmitted with an interval time t3. At each bit of the signal group S1, "1" and "0" of a binary signal expressing the data are not inverted, at the signal group S2, "1" and "0" expressing the data are inverted, and inversion and non-inversion are repeated every signal group. At bits of each signal group, since a time length expresses "1" and "0", a total time length of each signal group is different from that of other signal group. By repeating sets of inverted and non-inverted signal groups, the time length of each set is averaged, and hence, data processing can be made more efficient.

16 Claims, 21 Drawing Sheets

APPARATUS FOR INCLINATION DETECTION AND INPUT APPARATUS USING THIS APPARATUS

This application is a division of application Ser. No. 08/342,536, filed Nov. 21, 1994.

BACKGROUND OF THE INVENTION

1. Field of the Invention

The present invention relates to a detection apparatus for detection a two-dimensional or three-dimensional inclination of a light source emitting reference light and a detecting section, to an input apparatus or a coordinate input apparatus displaying a cursor on a screen using this detection apparatus, and further to a transmitting/receiving apparatus used for transmitting and receiving signals, for example, such as coordinate information and the like from an input apparatus for a coordinate input to a main frame of an apparatus with wireless transmission such as infrared transmission and the like, and particularly, to a transmitting/receiving apparatus for decreasing difference of various data transfer time, enabling efficient data transfer, and enabling transmission and reception of signals at high speed and in high reliability.

2. Description of the Related Art

Recently, multi-media goods such as a CD-I and the like have appeared, and their applications in various fields are considered. However, a conventional input apparatus used in the CD-I and the like is a wired controller with a joystick.

In addition, major apparatuses used as input apparatuses of plane coordinates in computers are coordinate input apparatuses having switching elements aligned in a matrix.

Further, major input apparatuses (remote controllers) used for audio/video equipment (hereafter: AV equipment) such as TV sets, VCR's and the like are ones to perform switching operations, for example, to shift designated portions on a reservation screen.

SUMMARY OF THE INVENTION

Although the controller with a joystick is suitable to operations to move characters on a screen and to direct operations, it is not suitable to operations to match a cursor with a button appearing at an optional position on a screen. In addition, since this type of controller is a wired type, operations only near a screen are possible.

Further, a conventional coordinate input apparatus requires an installation space of a command board, its structure is complicated, and its cost is expensive.

Furthermore, since a remote controller used for an AV equipment shifts designated portions on a screen with switching operations, switching operations are complicated. Still more, since this type of remote controller has various switches, a user should select a switch to shift a designated portion on the screen, and hence, the user cannot perform speedy input operations.

FIG. 33 shows an example of a transmitted signal adopted in an infrared remote controller used for a conventional home electric equipment.

From the remote controller, the signal shown in FIG. 33 is transmitted via infrared rays. In a main frame of a home electric equipment and the like, this infrared rays are received, and waveform shaping of a received signal is made. From a rectangular wave signal made waveform shaping of, transmitted data are discriminated.

The transmitted signal shown in FIG. 33 is the signal that a carrier signal at a predetermined frequency is made phase modulation. A signal group is formed with a definite quantity of data including this transmitted signal, each signal group is transmitted after a definite period. The top of each signal group is a leader code 10 that its high level period is a predetermined time length t1 and subsequently its low level period is a predetermined time length t2, and a signal 11 based on a transmitted signal follows it. The signal 11 expresses "1" and "0" of a binary signal. In infrared transmission and reception, conventionally, as shown in FIG. 34(A), "0" of the binary signal is expressed in case the time length of the high level is unit time T and that of the low level is also the unit time T. As shown in FIG. 34(B), "1" of the binary signal is expressed in case the time length of the high level is the unit time T and that of the low level is 3T that is three times of the unit time T.

There are following problems in conventional transmitting/receiving apparatuses using infrared rays.

A signal 111 is one that various data are coded. For example, if there are plenty of bit data having "1" of the binary signal, the time length of the whole signal group becomes long since the time length of a bit "1" is 4T as shown in FIG. 34(B). In addition, if there are plenty of bit data having "0" of the binary signal, the time length of the whole signal group becomes short since the time length of a bit "0" is 2T as shown in FIG. 34(A). Therefore, since, in a transmitting apparatus and a receiving apparatus, data processing time or a time margin should be set through considering the longest whole time length of a signal group, processing in a data processing circuit is not efficient, and a work load of the data processing becomes large. Further, as shown in FIG. 34(A), "0" or of the binary signal is expressed with 2T that is twice of the unit time T, and, as shown in FIG. 34(B), "1" of the binary signal is expressed in 4T that is four times of the unit time T. Therefore, the time length of a unit bit is 2T in minimum and 4T in maximum. Hence, the time length to express a bit is 3T in average.

In this manner, if the time length of 3T is necessary to express a bit, long time for transmission of a definite data group becomes necessary, and hence, if an infrared transmitting apparatus using transmitted data is used, a transmission rate of coordinate input information becomes excessively low so that the apparatus cannot correspond to high-speed movement of a cursor mark on a screen and the like.

The present invention is to solve conventional problems as above described, and hence, objects of the present invention are to provide an inclination detecting apparatus capable of detection an inclination of a reference light source and a light receiving section, using the reference light source and the light receiving section, and to enable it to be applied to an input apparatus and a coordinate input apparatus to command a cursor on a screen, and furthermore, to three-dimensional position detection in virtual reality. In addition, a further object of the present invention is to provide a transmitting/receiving apparatus capable of transmitting a transmitted signal from a transmitting apparatus to a receiving apparatus at high-speed and in high reliability. Still more, a furthermore object of the present invention is to provide a transmitting/receiving apparatus having no affection that a transfer rate of transmission and reception of coordinate data is made to become low through including data transfer of an operation signal, in case data transfer becomes efficient through averaging a transfer time length of each group and an operation signal as well as coordinate data is transmitted and received.

The present invention comprises a light source emitting reference light and a detecting section, both of which are located at separated positions, the detecting section comprising an iris portion to make the reference light a spot light and a light receiving portion to detect this spot light, said light receiving portion comprising a X side of light receiving portion to detect movement of the spot light toward a X-axis direction and a Y side of light receiving portion to detect movement of the spot light toward a Y-axis direction when an optical axis is defined as the Z-axis, and the X-axis and Y-axis are defined on a plane perpendicular to the Z-axis, wherein an inclination between a direction connecting said light source to said detecting section and said Z-axis is detected through calculation processing of difference between received light quantity of the X side of light receiving portion in a X-axis direction and received light quantity of the Y side of light receiving portion in a Y-axis direction.

In addition, in said inclination detection apparatus, a four-divided light receiving portion is provided in the light receiving portion, and through calculation processing of the sum of the received light quantity of the first pair of divided light receiving portion located obliquely against X-Y axes, the sum of the received light quantity of the second pair of divided light receiving portion located obliquely against X-Y axes in the opposite direction to the first pair, and difference between the sum of the received light quantity of the first pair of divided light receiving portion and the sum of the received light quantity of the second pair of divided light receiving portion, a rotation quantity centering the Z-axis is detected.

The present invention is characterized in a transmitting/receiving apparatus comprising a transmitting apparatus to transmit phase-modulated signals every signal group with a definite interval, and a receiving apparatus comprising a waveform shaping block to perform waveform shaping of received signals of each signal group, and a discriminating section to discriminate "1" and "0" of the binary signal from the waveform-shaped signal, wherein, from the transmitting apparatus, a signal group including inverted data of "1" and "0" of the binary signal converted from data to be transmitted, and a signal group including not inverted data are regularly repeated and transmitted.

Numbers "1" and "0" of the binary signal are expressed through changing a time length of a unit bit of signals.

In a above-described means, a transmitted signal is transmitted, for example, from an infrared emitting element provided in a transmitting apparatus, while, in a receiving apparatus, a light receiving portion to receive the infrared signal emitted from said infrared emitting element, and a waveform shaping block to perform waveform shaping of the output of this received light are provided. In addition, a signal group comprises a leader code composed of one period of a high level and a low level, a parity bit, and bits for transfer data expressing coordinate data. Data composing this group are sequentially transmitted with a definite interval, and hence, coordinate information and the like are continuously transmitted, for example, from an input apparatus to a main frame of a computer, an AV equipment, and further a game machine and the like.

Further, as a concrete structure that a signal group including inverted data of "1" and "0" of the binary signal converted from data to be transmitted, and a signal group including not inverted data are regularly repeated and transmitted, there are one case that the signal group with inverted data and the signal group with not inverted data are repeated alternately and transmitted, and another case that, for example, the signal group with inverted data and the signal group with not inverted data are repeated every two or three groups and transmitted. Furthermore, there is also a further case that two or more signal groups with not inverted data sequentially continue, subsequently, one signal group with inverted data succeeds, and thereafter a plurality of signal groups with not inverted data succeed.

In above-described means, a high level and a low level of a signal form a unit bit respectively, and "1" or "0" of the binary signal is expressed with whether each bit is the unit bit or integer times of the unit time T. Further, preferably, said "integer times" are "twice," "0" of the binary signal is expressed when each bit is one unit time length T, and "1" of the binary signal is expressed when the time length of a bit is 2T.

In addition, it is preferable to provide a inversion bit in each signal group for showing whether a signal in the signal group is the signal showing whether "1" and "0" of the binary signal of the data to be transferred are inverted or not. For example, if a signal expressed with each bit of the signal group is the signal that "1" and "0" of the binary signal of the data to be transferred are inverted, the inversion bit becomes what expresses "1," while, if a signal expressed with each bit of the signal group is the signal that "1" and "0" of the binary signal of the data to be transferred are not inverted, the inversion bit becomes what expresses "0".

Further, if a transmitting apparatus is mounted in an input apparatus for inputting a coordinate position and a receiving apparatus is mounted in a main frame of the apparatus having a screen for coordinate display, signal groups transmitted from the transmitting apparatus are separated into signal groups where coordinate data are the subject and other signal groups where operation signal data are the subject, and the signal groups where operation signal data are the subject are transmitted only when operation members of the input apparatus are operated. Thus, signal groups transmitted from the transmitting apparatus are separated into the signal groups including coordinate data and the signal groups not including them, and the signal groups not including coordinate data are transmitted only when operation members of the input apparatus are operated.

For example, when an operation member of the input apparatus is not operated and only coordinate data are transmitted from the input apparatus to the main frame of the apparatus, the subject of each signal group is coordinate data. Further, when an operation member of the input apparatus is operated during transferring coordinate data from the transmitting apparatus, signals composing the signal group is coded-data of operation signals. As for its transfer ratio, for example, when an operation member of the input apparatus is operated, a signal group where coordinate data are the subject and a signal group where operation signals are the subject can be transferred alternately, or, when two or three signal groups where coordinate data are the subject are transferred, a signal group where operation signals are the subject is transferred. In this case also, all the data of the signal groups, that is, the data where "1" and "0" are inverted and the data where "1" and "0" are not inverted, are regularly combined and transmitted.

In the above description, a signal group where coordinate data are the subject means that all the bits for data transfer except a leader code, an inversion code, and a parity bit express coordinate data such as X-Y coordinates, and a signal group where operation signals are the subject means said bits for data transfer express only operation signal data. However, the signal group where coordinate data are the subject means that, in said bits for data transfer, besides data showing X-Y coordinates, essential data, for example, data for identifying an angle of a rotation direction of an input apparatus 3 against the Z-axis in FIG. 1 is included, and also operation signal data for operation members that are provided in the input apparatus, have high utilization, and are restricted, is included. In this case, operation signal data for operation members that are provided in the input apparatus, and have low operation frequency is included in the signal group where operation signals are the subject.

In addition, in case, at the top of each signal group, a leader code composed of a high level signal and a low level signal, it is preferable to identify through the time length of this leader code whether a signal of the signal group is the signal where coordinate data are the subject or the signal where operation signal data are the subject. Although the time length of the leader code means the whole time length of the leader code composed of one period of a high level and a low level, concretely, time lengths of the high level and low level can be different, and, assuming that the time length of high level of the leader code in a signal group where coordinate data are the subject and the signal where operation signal data are the subject is same in each signal group, only time lengths of low level of the leader code can be different.

Further, the present invention is characterized in a transmitting/receiving apparatus comprising a transmitting apparatus to transmit a phase-modulated signal, and a receiving apparatus having a waveform shaping block to perform waveform shaping of said received signal, and a discriminator to disseminate "1" and a "0" of the binary signal from time lengths of a high level and a low level of the waveform-shaped signal, wherein said discriminator measures whether, on the rectangular wave signal made waveform-shaping, each of time lengths of a high level and a low level is unit time T or integer times of the unit time T, sets each of the high level and the low level of a signal as a unit bit, and discriminates "1" or "0" of the binary signal every bit.

Still more, the present invention is characterized in a transmitting/receiving apparatus comprising a transmitting apparatus to transmit a phase-modulated signal, and a receiving apparatus having a waveform shaping block to perform waveform shaping of said received signal, and a discriminator to disseminate "1" and "0" of the binary signal from time lengths of a high level and a low level of the waveform-shaped signal, wherein, on said signal, each of the signal in the high level and the low level forms a unit bit, "1" or "0" of the binary signal is expressed through whether each bit is unit time T or integer times of the unit time T, said discriminator measures a period of two successive unit bits of a high level and a low level or low level and a high level so that the discriminator discriminates a sort of the binary signal of the succeeding bit in the period from a sort of the binary signal of the preceding bit in this period and the preceding period.

In the both means above described, a transmitted signal is transmitted, for example, from an infrared light emitting element provided in a transmitting apparatus, and, in a receiving apparatus, a light receiving section to receive the infrared signal emitted from said infrared light emitting element, and a waveform-shaping block to perform waveform-shaping of an output of this received light are provided. A discriminator measuring time of a high level and a low level against the waveform-shaped signal has a self-timer or a clock oscillator, measures said time on the basis of this timer or the count of these clock signals, and is, for example, a digital arithmetic circuit where a CPU of a microcomputer is the subject.

In addition, it is preferable that a time length and a sort of a binary signal of a reference bit provided at a predetermined position of a signal are determined, a sort of a binary signal of a first bit following the reference bit through measuring a period, setting a starting position of the reference bit as a starting point, subsequently, discriminates a sort of a binary signal of the second bit through measuring a period, regarding a starting position of the reference bit as a starting point, and discriminates a sort of a binary signal of each bit through repeating this procedure.

The above-described reference bit is, for example, a bit of a low level in a leader code, and a time length of this bit is, for example, 2T or 4T.

Integer times of said unit time T is, for example, two times, "0" of a binary signal is expressed when a time length of each bit is T, and "1" of a binary signal is expressed when a time length of each bit is 2T (this means 2 times of T).

In addition, it is preferable that a parity bit is provided in a group of signals, and this parity bit expresses whether a sort "1" of a binary signal of each bit of a high level in a rectangular wave signal is even or odd, or whether a sort "1" of a binary signal of each bit of a low level in a rectangular wave signal is even or odd. In this case, although either of a parity bit for each bit of a high level and a parity bit for each bit of a low level can be provided, it is preferable to provide both of the parity bits in the group of signals. Since these parity bits are same as said each signal, "1" or "0" is expressed whether a time length of a high level or a low level is unit time T or integer times of the unit time T (for example, "2T").

In each means above described, it is preferable that a bit count of the group of signals is odd, regarding each of a high level and a low level as a unit. However, a top bit of the group of signals is a bit of a high level, and a last bit also becomes a bit of a high level.

In the first means above described, reference light is given as a spot light with a predetermined area at an iris portion of a detecting section. A light receiving portion has a X side of light receiving portion to detect movement of the spot light toward a X-axis direction and a Y side of light receiving portion to detect movement of the spot light toward a Y-axis direction, and can detect a two-dimensional inclination between a line connecting a light source to the detecting section and Z-axis that is an optical axis of the iris portion through calculating difference between received light quantities at both light receiving portions.

In the second means, through calculating the sum of received light quantities of the first pair of divided light receiving portion located obliquely in the four-divided light receiving portion, the sum of received light quantities of the second pair of divided light receiving portion, and difference between sums of received light quantities of the two portions, a rotation quantity against the Z-axis can be approximately detected, and, jointly using this and said two-dimensional inclination detection, a three-dimensional inclination detection between a light and the detecting section can be performed.

Further, in the above-described means, from a transmitting apparatus, the signal group with inverted data and the signal group with not inverted data are repeated alternately and transmitted. In sequential transmission of the signal groups, if there are plenty of bit data having "1" of the binary signal, the time length of the whole signal group becomes long, and, if there are plenty of bit data having "0" of the binary signal, the time length of the whole signal group becomes short. Here, if, on the data to be transferred, a signal group with inverted data and the signal group with not inverted data are regularly mixed and transmitted, in some time, a time length of a signal group becomes long because plenty of bit data having "1" are included in the data to be transmitted, but a signal group succeeding this signal group has plenty of "0" because of signal inversion so that a time length of the whole signal groups becomes short. Therefore, regarding them as a gathering of each set composed of a predetermined number of signal groups, a time length of each set is averaged. Hence, transfer time of a whole signal to be transmitted is averaged, data processing time in the transmitting apparatus and the receiving apparatus can be averaged, and efficient data processing can be performed.

Still more, if, in each signal, a high level and a low level form a unit bit respectively, and "1" and "0" of the binary signal are expressed whether each bit is the unit bit or integer times of the unit time T, a time length of each signal group itself becomes short, and hence, a data transfer rate can be increased.

In this manner, since a signal group with inverted data of "1" and "0" of transfer data and a signal group with not inverted data are alternated every signal group, through providing, in each signal group, an inversion bit for showing whether a signal in the signal group is the signal that "1" and "0" of the binary signal of the data to be transferred is inverted or not, discrimination of whether the data every data reception of each signal group is the inverted data or not becomes easy.

In addition, if a transmitting apparatus is mounted in an input apparatus for inputting a coordinate position and a receiving apparatus is mounted in a main frame of the apparatus having a screen for coordinate display, signal groups transmitted from the transmitting apparatus are separated into signal groups where coordinate data are the subject and other signal groups where data of operation signals are the subject, and the signal groups where data of operation signals are the subject are transmitted only when operation members of the input apparatus are operated. Since it becomes unnecessary to have the signal group where coordinate data are the subject include plenty of bits to express data regarding to operation signals, a time length of a signal group including coordinate data can be shortened. Thus, a transfer rate of the coordinate data can be increased, and resolution of a coordinate input on a screen can be increased, too.

Further, in the above-described means, on the rectangular wave signal made waveform-shaping in a transmitting apparatus, each of time lengths of a high level and a low level forms unit time T. And, according to whether each of a high level and a low level is unit time T or integer times of the unit time T, "1" or "0" of the binary signal every bit is discriminated. If "1" is expressed as "2T" that is two times of the unit time T, the longest time length of a bit is "2T," and the shortest is "T". Hence, an average time length in which a bit is expressed is "1.5T". In a conventional example shown in FIG. 34, since an average time length in which a bit is expressed is "3T," the above means has two times of the coding efficiency of the conventional example. Therefore, even if a transmitting/receiving apparatus having the same resolution as a conventional infrared transmitting/receiving apparatus that applies a signal format shown in FIG. 34 is used, the present invention can attain twice of the transfer rate.

Subsequently, although at the signal format shown in FIG. 34 in the conventional infrared transmitting/receiving apparatus, unit time was nearly 0.5 ms, in the present invention, it is possible to shorten the unit time at 0.2 ms so that the transfer rate can be increased more. If the unit time is shorten at 0.2 ms and the like, there is the possibility that an error of bit discrimination occurs when, for example, a conventional infrared transmitting/receiving apparatus is used.

As a countermeasure of this issue, the present invention measures every period a period of a high level and a low level following the high level or a period of a low level and a high level following the low level, and can discriminate a sort of a binary signal of a succeeding bit in a period on the basis of the time length measurement of the period through recognizing "1" and "0" of the preceding bit in the period beforehand. For example, setting a low level signal of a leader code as a reference bit, its time length is determined to be, for example, "2T." Setting the starting position of this reference bit as a starting point, the present invention measures time of one period of the reference bit and the first bit following this. Then, since the time length of the reference bit is known beforehand, the present invention can discriminate the sort of the binary signal of the first bit. Repeating this, the present invention measures a time length of each period, and discriminates a sort of a binary signal of each bit.

If, against a signal made waveform-shaping after receiving a signal that infrared rays are used, the present invention discriminates its time length, measuring a time length of a period of a high level and a low level of a low level and a high level has higher measurement precision than independently measuring a time length of a high level and a time length of a low level. Therefore, by discriminating a sort of a binary signal of each bit through measurement of a time length every period, the present invention can reduce an error rate of discrimination. Since bit discrimination based on the measurement of the time length every period has high reliability, precision of the bit discrimination does not decrease sharply even if a time length of unit time T is shorten, for example, at nearly 0.2 ms.

In addition, the present invention increases reliability of signal discrimination through including either or both of a parity bit that expresses whether the number of "1" of high level bits is even or odd, or a parity bit that expresses whether the number of "1" of low level bits is even or odd.

Further, since, on a transmitted signal of the present invention, each of a high level and a low level is unit bit, the group of signals ends with the final bit in a high level if a top bit of a group of signals is set in a high level, and the number of all bits is odd. In conventional signal formats shown in FIG. 33 and FIG. 34, since a high level and a low level compose bits as a pair, the final bit of a group ends in a low level. Therefore, as shown in FIG. 33, it was necessary to provide a stop bit 112 at the final position of a group of signals. However, since, in the present invention, the final bit is always In a high level because of the odd number of bits, the stop bit is unnecessary. Therefore, the signal format can be simplified.

DETAILED DESCRIPTION OF THE PREFERRED EMBODIMENTS

Hereafter, embodiments of the present invention will be described, referring to drawings.

Figure 1:
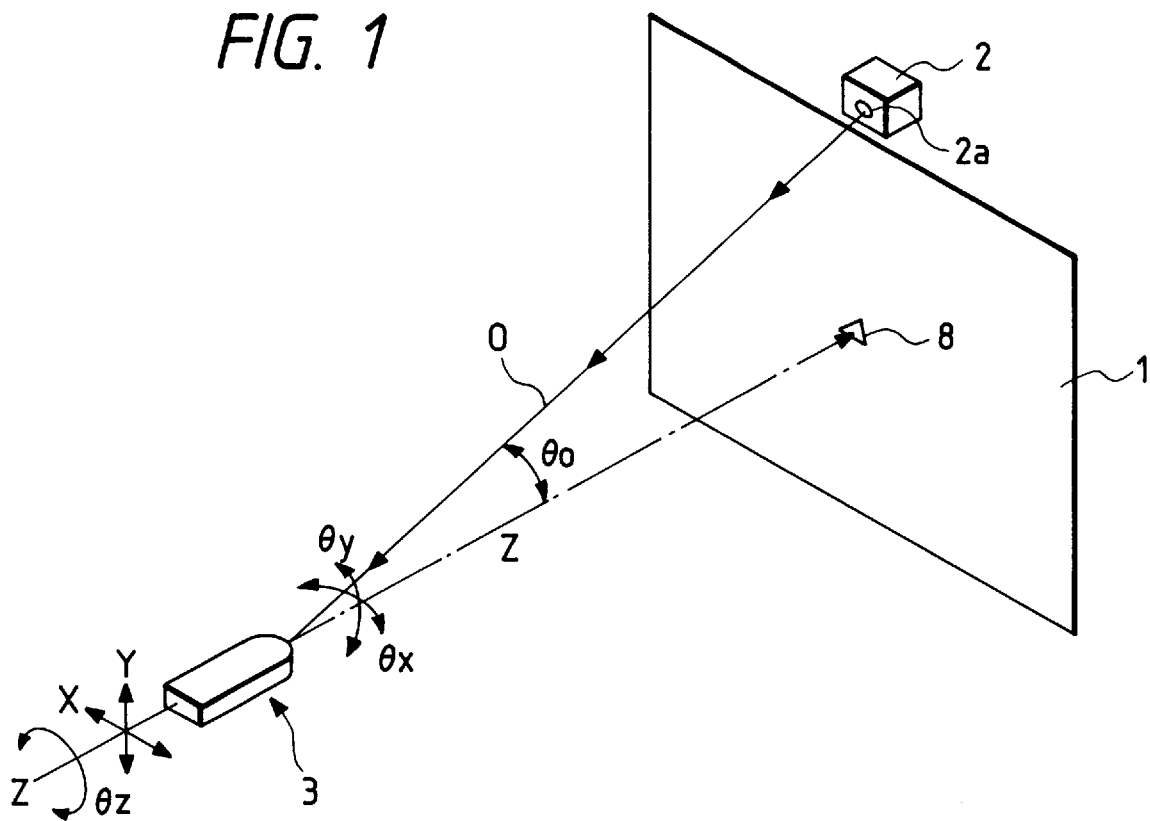
FIG. 1 is a perspective view showing an input apparatus capable of cursor pointing on a screen, using an inclination detection apparatus of the present invention.
Figure 2:
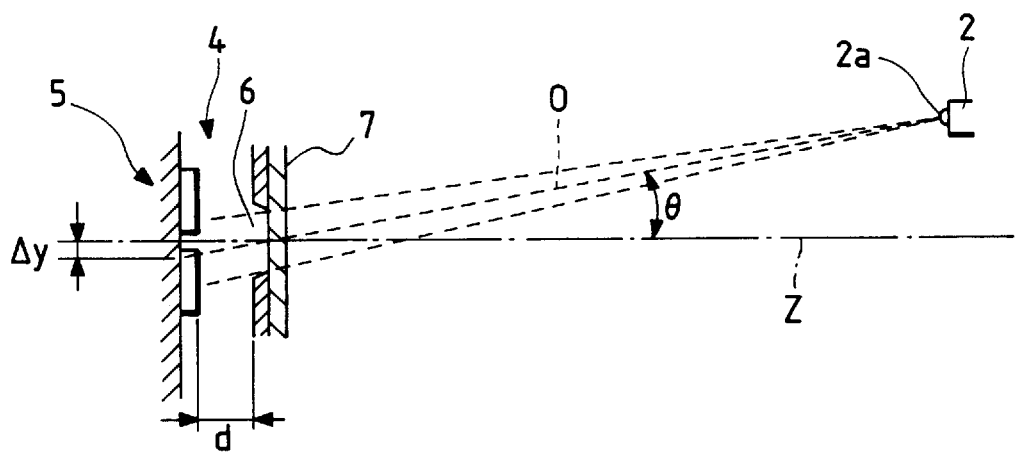
FIG. 2 is a cross-sectional view showing the internal structure of an inclination detection apparatus.
Figure 3:
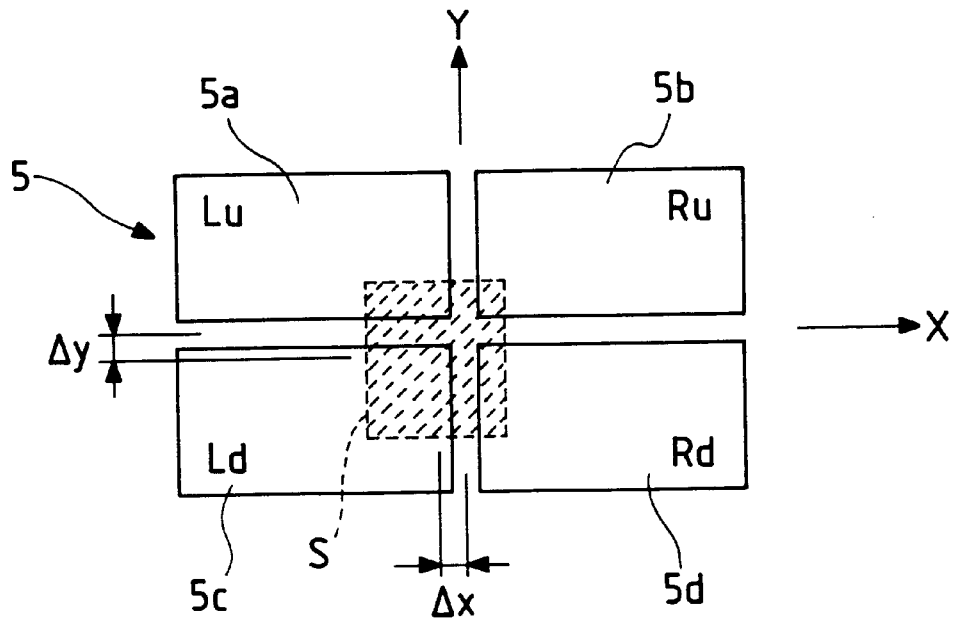
FIG. 3 is an enlarged plan of a four-divided light receiving section provided in FIG. 2.

FIG. 1 is a perspective view showing an input apparatus using a two-dimensional inclination detection apparatus of the present invention, FIG. 2 is an enlarged cross-sectional view showing the structure of an inclination detection apparatus, and FIG. 3 is an enlarged plan of a four-divided light receiving section.

In FIG. 1, a code 1 is a CRT screen of a computer, an AV equipment, and the like. On the CRT screen 1, a light emission apparatus 2 is fixed, and this light emission apparatus 2 has an infrared LED 12 as a light source 2a emitting reference light.

A code 3 is a wireless input apparatus (a remote control apparatus). At the top of this input apparatus 3 a detecting section 4 having the structure shown in FIG. 2 is provided. At this detection section 4, a light receiving portion 5 is provided, and before it an iris portion 6 and a visible-radiation cutoff-filter 7 are provided.

Assuming an optical axis perpendicular to an opening center of said iris portion 6 as the Z-axis, this Z-axis becomes an axis advancing along the center of the input apparatus 3. As shown in FIG. 3, said light receiving portion 5 is composed of p-i-n photodiodes having four-divided light receiving ports 5a, 5b, 5c, and 5d. As for X-Y coordinates perpendicular to the Z-axis, a pair of the four-divided light receiving portions 5a and 5b and another pair of ones 5c and 5d are divided toward the Y-axis, and a pair of ones 5b and 5d and another pair of ones 5a and 5c are divided toward the X-axis.

Since the iris portion 6 has a rectangular opening, infrared rays emitted from the light source 2a are radiated to the light receiving portion 5 as a rectangular spot light S. As shown in FIG. 3, the rectangular spot light S has an area not exceeding the light detection regions of the four-divided light receiving portions 5a to 5d. In addition, through providing the visible-radiation cutoff-filter 7, in the light receiving portion 5, noise components of external light except the infrared rectangular spot light S is cut off as much as possible.

At each of the four-divided light receiving portions 5a, 5b, 5c, and 5d, a detected current based on an area radiated with the spot light can be obtained. Although circuit processing will be described later, this detected current is converted to a voltage and performed arithmetic processing.

Then, detected outputs based on areas radiated with the spot light S at the four-divided light receiving portions 5a, 5b, 5c, and 5d are shown as Lu, Ru, Ld, and Rd.

The two-dimensional inclination of the Z-axis ($\theta x$, $\theta y$) extending to the front of the input apparatus 3 can be obtained as follows.

At first, at the light receiving portion 5 shown in FIG. 3, positioning errors of the center of the spot light S against the center of X-Y coordinates Δx and Δy can be obtained by the calculation shown in the following expression (1).

$$\Delta x \ \{(Ru+Rd)-(Lu+Ld)\}/(Ru+Rd+Lu+Ld)$$

$$\Delta y \ \{(Ru+Lu)-(Rd+Ld)\}/(Ru+Rd+Lu+Ld) \quad (1)$$

The denominator of the above expression (1) is a sum of detected outputs at all the four-divided light receiving portions, and through this summing, this apparatus can correspond to change of light volume of the whole spot light.

In a FIG. 2, defining that the line connecting the light source 2a to the opening center of the iris portion 6 is o, the angle formed with the line o and Z-axis is θ (radian), and the distance between the iris portion and the surface of the light receiving portion 5 is d, d is minute, and hence, $$\Delta y = d\tan \theta \approx d\theta \quad (2)$$

is obtained. However, as shown in FIG. 1, in case the Z-axis is horizontal to the center of the CRT screen 1, an offset angle θ0 exists, and hence, through subtracting the offset angle θ0 from the angle obtained from the above expression (2) or disposing the opening shifted by dθ, this apparatus can detect the inclination angle when the input apparatus 3 is manually inclined. In addition, if the light source 2a is located at the center of the horizontal width of the CRT screen, through replacing Δy to Δx and replacing θ to θx in said expression (2), with this calculation the inclination angle θx of the input apparatus can be detected.

In the input apparatus 3 shown in FIG. 1, through providing a transmitting means via infrared rays and FM waves, providing a receiving means in the main frame of the apparatus having the CRT screen 1, and transmitting above calculation result from the input apparatus to the main frame of the apparatus, this apparatus can give the main frame of the apparatus information on the inclination quantity of θx and θy. If, in the main frame of the apparatus, the pointing cursor 8 on the CRT screen 1 is moved on the basis of this information, a user can feel that the pointing cursor 8 moves according to the inclination operation of the input apparatus 3, and with remote control operations of the input apparatus 3, a cursor pointing input to the CRT screen becomes possible.

In addition, if the main frame of the apparatus having the CRT screen 1 is connected to the input apparatus 3 with a cord, it is possible to provide said arithmetic processing section in the main frame of the apparatus. In this case, after converting the light detected output with the four-divided light receiving portions 5a, 5b, 5c, and 5d provided in the input apparatus 3 to the current or the voltage, this apparatus sends it to the main frame of the apparatus with said cord, performs said arithmetic processing in the main frame of the apparatus, and obtains inclination quantities θx and θy.

Further, if the input apparatus 3 is operated in hand, the case that a feeling of togetherness cannot be obtained in the relationship between the actual inclination quantities θx and θy and the movement quantity of the cursor 8 on the screen when a user is near the CRT screen 1, or when the user is far from it, can be supposed. In this case, it is possible to provide in the input apparatus 3 a change-over switch for changing a ratio of the actual inclination quantities θx and θy to the movement quantity of the cursor 8 on the screen.

In the embodiment shown in FIG. 1 and FIG. 2, since the apparatus sets down the reference light emitted from the light source 2a with the opening of the iris portion 6, it is necessary to increase the emitted light volume in some extent so as to perform highly precisional light detection in the light receiving portion 5.

Then, in order to effectively detect the emitted light volume of the light source 2a, it is considered to provide a condenser lens between the iris portion 6 and the light receiving portion 5. However, in this case, although the range of the inclination detection is restricted due to the focal length, it is possible to depress lowering of the range of the inclination detection through shortening the distance d and lengthening the focal length f.

Figure 4:
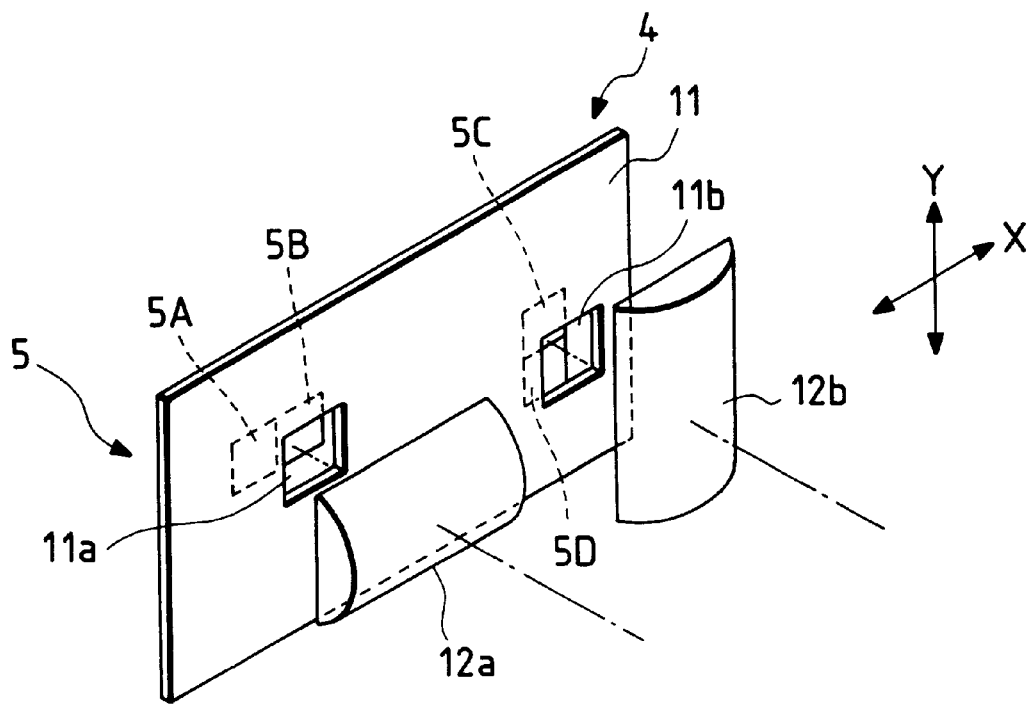
FIG. 4 is a partial perspective view of an inclination detection apparatus providing two pairs of two-divided light receiving sections, FIGS. 5(A) and (B) are enlarged plans showing the two-divided light receiving section in FIG. 4.
Figure 5A:
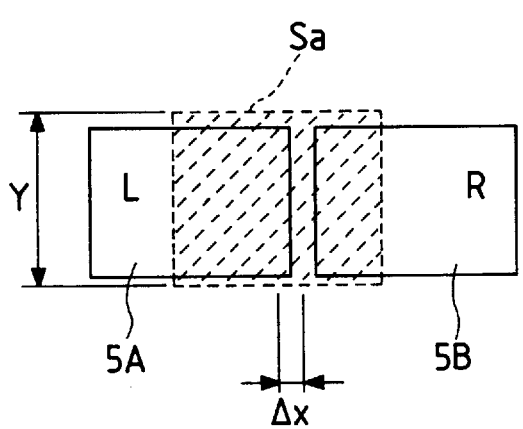

In addition, in order to effectively use the emitted light volume of the light source 2a, it is possible to make the detecting section 4 in the input apparatus 3 the structure shown in FIG. 4 and FIG. 5(A) and (B).

In the detecting section 4, as the detecting section, the two-divided light receiving portion 5A and 5B for Δx detection, and the two-divided light receiving portion 5C and 5D for Δy detection are provided. At the front of each light receiving portion, openings 11a and 11b of the iris portion 11 are located. Further, at the front of the light source side of the openings 11a and 11b, cylindrical lenses 12a and 12b are provided.

Figure 5B:
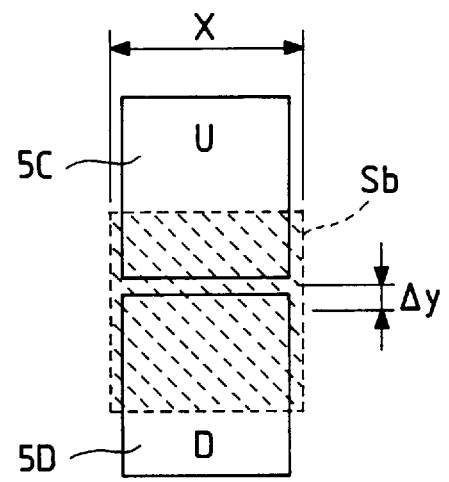

As shown in FIG. 5(A), through providing the cylindrical lenses, in regard to the spot light Sa formed at the two-divided light receiving portions 5A and 5B for Δx detection, light converges toward the Y-axis perpendicular to the detected direction, but toward the X-axis, light does not converge. Reversely, as shown in FIG. 5(B), in regard to the spot light Sb formed at the two-divided light receiving portions 5C and 5D for Δy detection, light converges toward the X-axis perpendicular to the detected direction, but toward the Y-axis, light does not converge. Naming the light received outputs at the two-divided light receiving portions 5A, 5B, 5C, and 5D L, R, U, and D respectively, Δx and Δy are obtained in the following expression (3).

$$\Delta x \ (R-L)/(R+L)$$

$$\Delta y \ (U-D)/(U+D) \quad (3)$$

In this embodiment, in FIG. 5(A), since the X-axis component of the spot light Sa that is the detected direction is not focused with the lens, the spot light Sa is not affected with the focal length, and hence, the lowering of the detection range due to the focal length does not occur. Further, since in the direction of the Y-axis light converges, the received light quantity at the two-divided light receiving portions 5A and 5B increase, and hence, this apparatus can raise its detection precision. This is the same as that at the two-divided light receiving portions 5C and 5D in FIG. 5 (B).

Further, as shown in the expression (3), the arithmetic processing becomes simpler than that of the expression (1), and its arithmetic circuit can be simplified.

In the embodiment in FIG. 1 to FIG. 3, and the embodiments in FIG. 4 and FIG. 5, it is possible to detect the inclination quantities θx and θy in two dimensions through the arithmetic processing of the light received output. However, it is not possible to detect this rotation quantity in the case that the input apparatus 3 is rotated toward the direction of the angle θz through centering the Z-axis. Thus, if this apparatus rotates the input apparatus 3 toward the direction of the angle θz, in FIG. 3, the four-divided light receiving portions 5a, 5b, 5c, and 5d, and the spot light S rotates together at the same angle, and X-Y coordinates in the input apparatus 3 rotates. Therefore, at the detecting section 4 of the input apparatus 3, Δx and Δy against X-Y coordinates at the time of rotation centering the Z-axis are detected inconveniently, and the inclination quantities θx and θy against X-Y coordinates in a space cannot be detected correctly.

Thus, it is preferable to provide in the input apparatus 3 a sensor for detecting the rotation angle toward the direction of the angle θz. As this sensor, what uses a pendulum, what detects movement of a bubble in liquid using the principle of a level, or the like can be considered. Detecting the rotation angle of the input apparatus in the direction of the angle θz with this sensor, and correcting the rotation quantity against the directions of the X-axis and Z-axis, without relation to the rotation toward the direction of the angle θz of the input apparatus 3, this apparatus can detect the inclination quantities θx and θy.

Figure 6:
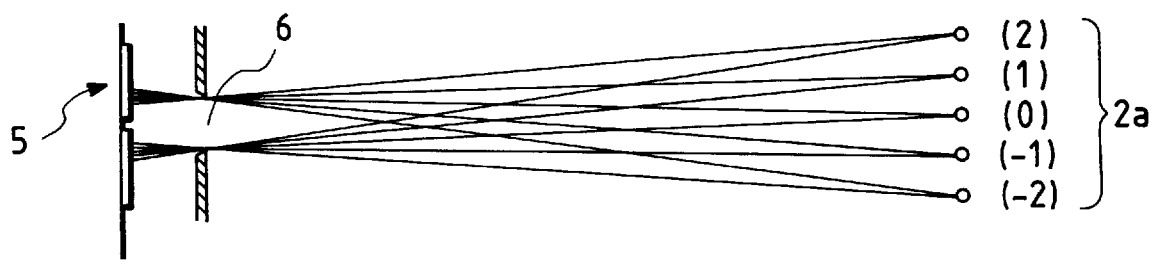
FIG. 6 is a plan showing a positional relation between a light source and a detecting section when detecting a three-dimensional angle.
Figure 7:
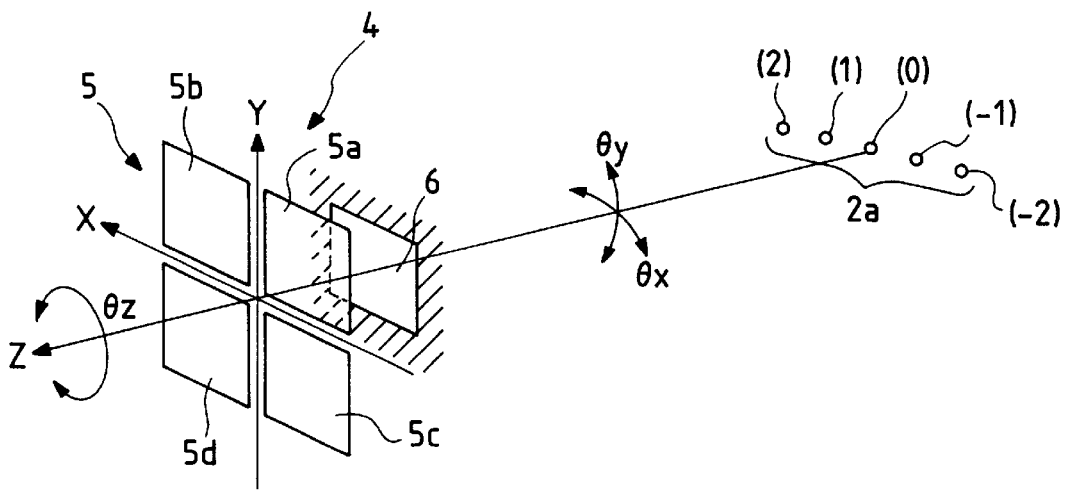
FIG. 7 is a perspective view showing a positional relation between a light source and a detecting section when detecting a three-dimensional angle.
Figure 8A:
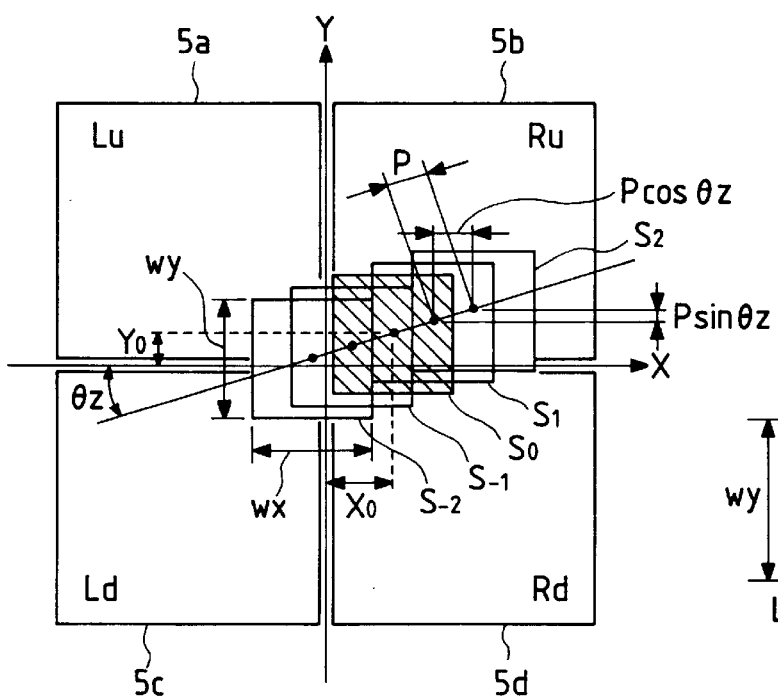
FIG. 8(A) is a plan showing a plurality of spot lights formed on a four-divided light receiving section.

In addition, through using the method, showing FIG. 6 to FIG. 8, for the light receiving portion 5 where the four-divided light receiving portions 5a, 5b, 5c, and 5d are provided, it is possible to approximately detect said angle θz within the range of 45 degrees through the calculation of the light received output at each of the four-divided light receiving portions.

In the apparatus shown in FIG. 6 to FIG. 8, the structure of the detecting section 4 in the input apparatus 3 is the same as that shown in FIG. 2 and FIG. 3, and hence, in the light receiving portion 5, the four-divided light receiving portions 5a, 5b, 5c, and 5d located vertically and horizontally along X-Y coordinates are provided. However, the light source 2a emitting the reference light has n pieces (5 pieces in this embodiment) of light emitting points that are horizontally aligned. In FIG. 6 and FIG. 7, the center point of the five light emitting points is expressed as (0), and the other four light emitting points are expressed as (1), (2), (−1), and (−2) in correspondence to their alignment direction.

Figure 8B:
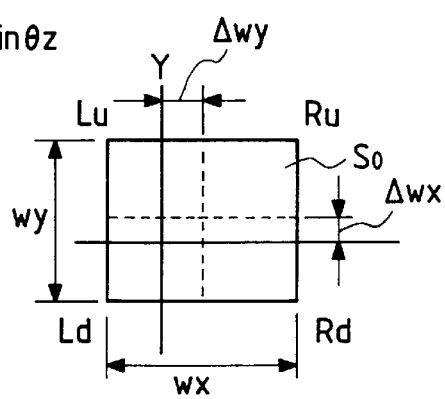
FIG. 8(B) is a plan showing a spot light positioning at a center.

The reference light emitted from each light emitting point is set down respectively with the opening of the iris portion 6, and forms a spot at each of the four-divided light receiving portions 5a, 5b, 5c, and 5d. In FIG. 8, the five spot lights are expressed as $S_0$, $S_1$, $S_2$, $S_{-1}$ and $S_{-2}$ corresponding to (0), (1), (2), (−1), and (−2). As shown in FIG. 8 (A), the pitch of the center of each spot light is named p. In addition, as shown in FIG. 8(B), the widths of a spot light are defined as wx and wy, and the position of the center of the central spot light $S_0$ in X-Y coordinates is defined as (Δwx, Δwy).

As shown in the expression (4) and expression (5), using the light received output Ru, Rd, Lu, and Ld, following calculations are performed. Here, "To" means (Ru+Rd+Lu+Ld).

$$X=\{(Ru+Rd)-(Lu+Ld)\}/To$$

$$Y=\{(Ru+Lu)-(Rd+Ld)\}/To \quad (4)$$

and $$A=\{(Ru+Ld)-(Rd+Lu)\}/To \quad (5)$$

The calculation of the expression (4) is the same as that of said expression (1). X and Y in the expression (4), if all the five spot lights are regarded as one spot light, means the positions of its center in X-Y coordinates, this is same as detecting the coordinates of the center of the central spot light $S_0$.

Here, the light receiving output at each of the four-divided light receiving portions 5a, 5b, 5c, and 5d corresponds to the area of the spot light emitted to each of the four-divided light receiving portions. Then, in FIG. 8(B), and obtaining the area of the central spot light $S_0$, expressing each of (Rd/To), (Rd/To), (Lu/To), and (Ld/To) as an expression of the area relating to wx, wy, Δwx, and Δwy, X and Y that these numbers are substituted in the expression (4), are named $X_0$ and $Y_0$. $X_0$ and $Y_0$ are shown in the expression (6). The position $(X_0, Y_0)$ shows the position of the center of the central spot light $S_0$.

$$X_0=2\Delta wx/wx$$

$$Y_0=2\Delta wy/wy \quad (6)$$

Subsequently, defining coordinates of each center of the spot lights $S_1$, $S_2$, $S_{-1}$, and $S_{-2}$ as $(X_1, Y_1)$, $(X_2, Y_2)$ $(X_{-1}, Y_{-1})$, and $(X_{-2}, Y_{-2})$, these are the ones that the X component Px and Y component Py of the pitch p of the spot light are added to the coordinate $(X_0, Y_0)$ of the central spot light $S_0$. Therefore, positions of each spot light in coordinates are expressed as the expression (7).

$$X_1=2(\Delta wx+Px)/w$$

$$Y_1=2(\Delta wy+Py)/wy$$

$$X_2=2(\Delta wx+2Px)/wx$$

$$Y_2=2(\Delta wy+2Py)/wy$$

$$X_{-1}=2(\Delta wx-Px)/wx$$

$$Y_{-1}=2(\Delta wy-Py)/wy$$

$$X_{-2=2}(\Delta wx-2Px)/wx$$

$$Y_{-2}=2(\Delta wy-2Py)/wy \quad (7)$$

The calculation of said expression (5) is that, in the four-divided light receiving portions, the sum of the light received output at the four-divided light receiving portions 5a and 5d is subtracted from the sum of the light received output at the four-divided light receiving portions 5b and 5c. Substituting the expression of the area of the central spot light $S_0$, $A_0$ is obtained as the expression (8).

$$A_0 = 4\Delta wx \cdot wy/(wx \cdot wy) \quad (8)$$
$$= (2\Delta wx/wx)\cdot(2\Delta wy/wy) = X_0 \cdot Y_0$$

Since, from the expression (8), a general formula, A=X·Y is obtained, this general formula is applied to each of spot lights $S_1$, $S_2$, $S_{-1}$, and $S_{-2}$, further, areas $A_1$, $A_2$, $A_{-1}$, and $A_{-2}$ are calculated from the formula (7), and consequently, the formula (9) is obtained.

$$A_1=X_1\cdot Y_1=\{2(\Delta wx+Px)/wx\}\cdot\{2(\Delta wy+Py)/wy\}$$

$$A_2=X_2\cdot Y_2=\{2(\Delta wx+2Px)/wx\}\cdot\{2(\Delta wy+2Py)/wy\}$$

$$A_{-1}=X_{-1}\cdot Y_{-1}=\{2(\Delta wx-Px)/wx\}\cdot\{2(\Delta wy-Py)/wy\}$$

$$A_{-2}=X_{-2}\cdot Y_{-2}=\{2(\Delta wx+2Px)/wx\}\cdot\{2(\Delta wy+2Py)/wy\} \quad (9)$$

The calculation of the area A against all the spot lights is equal to the sum of the areas $A_0$, $A_1$, $A_2$, $A_{-1}$, and $A_{-2}$. Therefore, calculating this sum and arrange it, the expression (10) is obtained.

$$A=X_0\cdot Y_0/5+2\times(1+4)\times(2\cdot Px/wx)(2\cdot Py/wy) \quad (10)$$

In FIG. 6 to FIG. 8, the number of the light emitting points are n=5. Hence, changing the expression (10) to the general formula, the expression (11) is obtained. However, in the expression (11), $X_0=X$ and $Y_0=Y$.

$$A = X_0 \cdot Y_0/n + \left(\sum_{i=1}^{n} i^2\right) x\{8/(wx \cdot wy)\} xPy \cdot Px \quad (11)$$

$$= X \cdot Y/n + \left(\sum_{i=1}^{n} i^2\right) x\{4P^2/(wx \cdot wy)\} x \sin 2\theta z$$

Performing the calculation of the expression (5) from above expression (11) on the basis of the light received output of the four-divided light receiving portions, terms X and Y through the calculation of the expression (4) and the term relating to the rotation quantity θz of the detecting section 4 centering the Z-axis can be obtained. In addition, the constant term (the second and third terms of the lower expression of the expression (11)) is the term relating to the number of the light emitting points and the distance between the light source 2a and the detecting section 4. Therefore, if, on the basis of the calculation result of the expression (11), the components of the calculation values of X and Y are removed, and correction on the distance is performed, detection of the rotation quantity θz against the Z-axis becomes possible.

Although the above detection is attained through designing the light source 2a provided in the fixed side as a plurality of light emitting points in serial alignment, according to the principle, it is possible to detect θz if the light source 2a has a pattern with direction tendency. Therefore, even if, for example, the light source 2a is a line light source long toward the horizontal or vertical direction, it becomes possible similarly to the above description to obtain the rotation quantity θz from the calculation of the expression (4) and (5).

In addition, because of this, three-dimensional inclination detection of θx, θy, and θz is possible, and hence, in the embodiment of FIG. 1, if the rotation angle of the orthogonal coordinates X-Y in correspondence to the rotation quantity of θz is corrected at the time when a user three-dimensionally moves the input apparatus that is a remote controller, it is possible to accurately move the pointing cursor 8 on the screen 1 on the basis of X-Y coordinates in a space.

Further, in this manner, since three-dimensional inclination detection is possible, it is possible to use this inclination detection apparatus as a detecting means in virtual reality.

Subsequently, FIG. 9 to FIG. 15 show the circuit structure used in said inclination detection apparatus.

Figure 9:
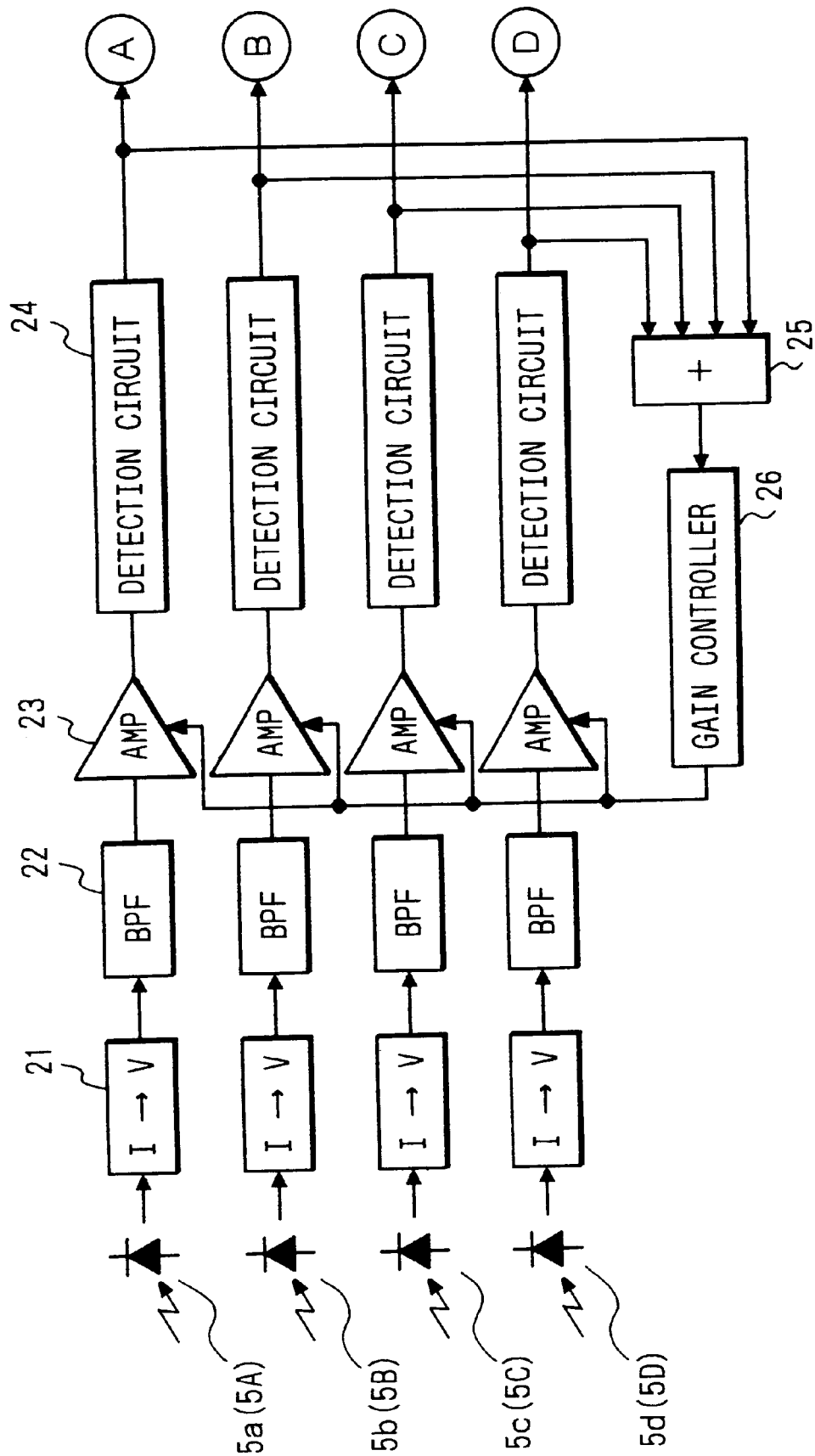
FIG. 9 is a circuit block diagram showing a processing circuit of a detected output from a light receiving section, FIGS. 10(A) and (B) are circuit block diagrams showing every embodiment the circuit structure of the succeeding stage of the circuit in FIG. 9.

FIG. 9 and FIG. 10 show the general circuit structures.

The emitted light from the light source 2a is defined as the intermittent light emission based on pulses with a regular period. Therefore, at each of the divided light receiving portions 5a to 5d or 5A to 5D, same-shaped pulse waves corresponding to said pulse period are detected.

In FIG. 9, a current-voltage converter 21 is connected to each of the divided light receiving portions, and the current value at each of the divided light receiving portions is converted to the voltage. Each detected voltage passes through the band-pass filter 22, and only the frequency component of the pulsed emitted light is taken out. In addition, each detected voltage is amplified with an amplifier 23, it is detected with a detection circuit 24, and the voltage corresponding to the received light quantity at each of the divided light receiving portions is taken out as a DC component. In addition, in FIG. 9, the voltage output from each detection circuit 24 is added with an adder 25 as the voltage value, and it is sent to an automatic gain controller (hereafter: gain controller) 26. Further, with the gain controller 26 the amplitude of the amplifier 23 is controlled.

Figure 10A:
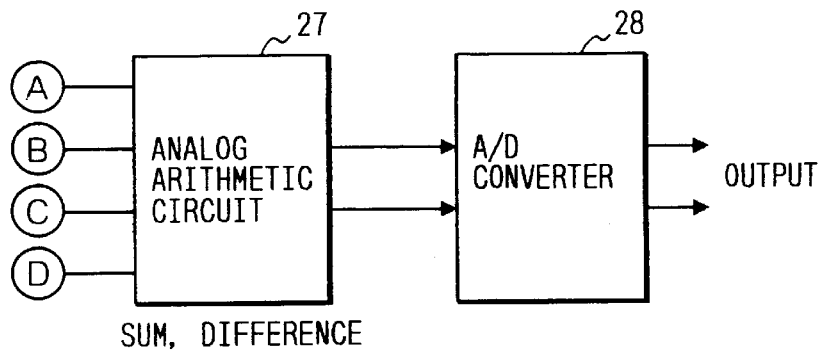
Figure 10B:
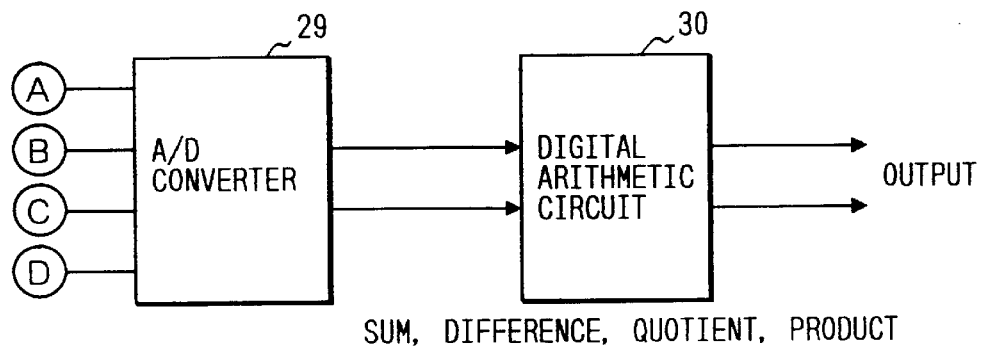

Each detected voltage from the detection circuit 24 is sent to, for example, an analog arithmetic circuit 27 shown in fir 10(A), the addition and subtraction are performed, and they are converted to digital values with an analog-digital converter (hereafter: A/D converter) 28. Or, as shown in FIG. 10(B), each voltage output from the detection circuit 24 is converted to digital values with an analog-digital converter (hereafter: A/D converter) 29, and each calculation such as addition, subtraction, multiplication and division is performed.

In case the circuits shown in FIG. 9 and FIG. 10 are provided in the input apparatus 3 shown in FIG. 1, the output after the calculation is transmitted to the main frame side of the apparatus having the screen 1 with the infrared transmission, FM transmission, or the like. In the main frame side of the apparatus this apparatus performs position control of the cursor 8 on the screen 1 on the basis of received information.

In addition, if the input apparatus 3 is connected to the main frame of the apparatus with a cord, it is possible to send the current output from the divided light receiving portion or the voltage output after the current-voltage conversion to the main frame of the apparatus, and to provide the circuits of the succeeding stage in the main frame side of the apparatus.

Figure 11:
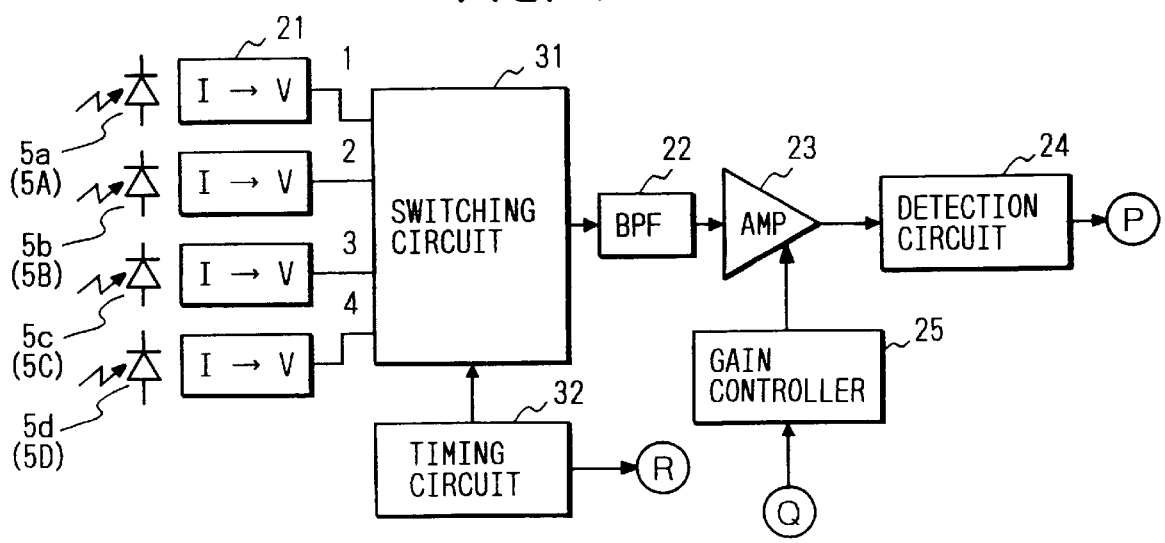
FIG. 11 is a circuit block diagram showing another example of a processing circuit of a detected output from a light receiving section, FIGS. 12(A) and (B) are circuit block diagrams showing every embodiment the circuit structure of the succeeding stage of the circuit in FIG. 11.

In the circuits shown in FIG. 11, after the detected currents obtained at the divided light receiving portions 5a to 5d or 5A to 5D are converted respectively to the voltage in the current-voltage converter 21, they are performed time-sharing in a switching circuit 31, and are sent to a band-pass filter 22. Switching of the switching circuit 31 is performed with a timing circuit 32 in correspondence to the light emission timing of the light source 2a with pulsed light emission. The voltage output performed time-sharing with the switching circuit 31 is amplified with an amplifier 23 through the band-pass filter 22, and is detected with a detection circuit 24.

Figure 12A:
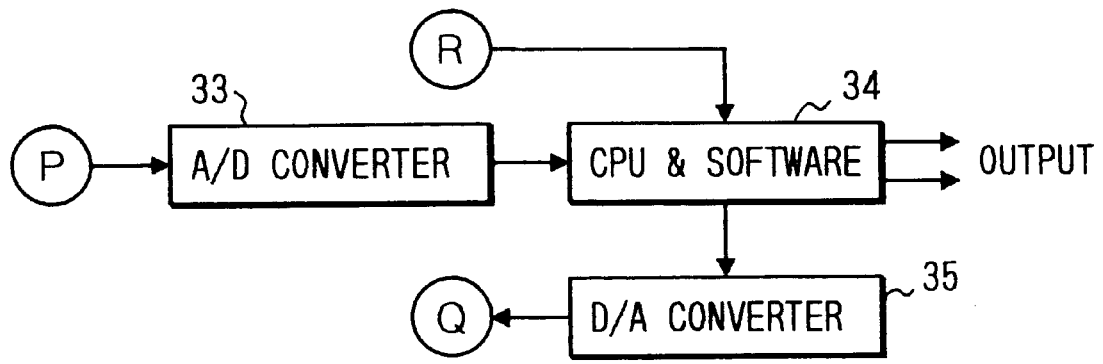

Then, as shown in FIG. 12(A), the voltage that becomes the time-shred output is converted with an analog-digital converter 33, and is sent to a CPU 34. In the CPU 34, addition, subtraction, multiplication and division are performed. In addition, the digital signal sent to the CPU is made to return to the analog value with a digital-analog converter 35, and this is sent to a gain controller 26.

Figure 12B:
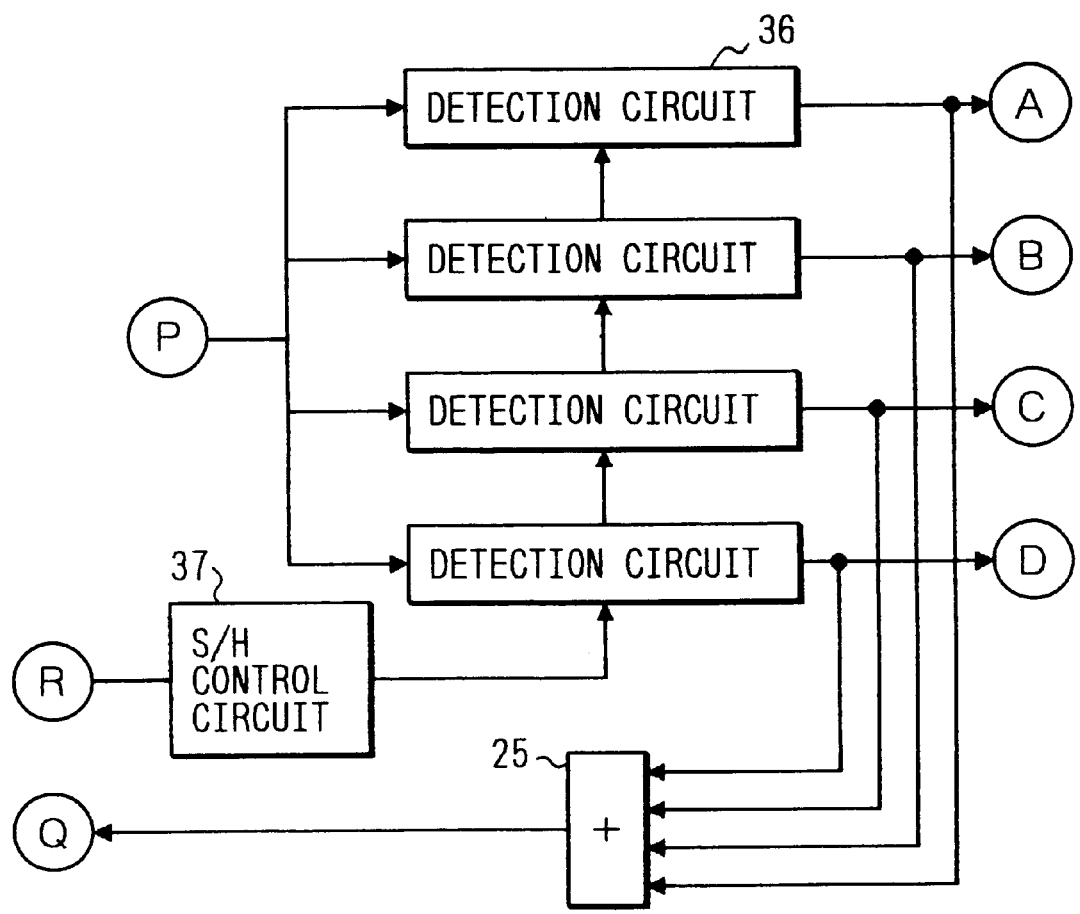

Or, as shown in FIG. 12(B), the time-shared output from the detection circuit 24 is sampled with a plurality of peak sample hold circuits, its peak values are held, and the analog output can be obtained. This is sent to the analog arithmetic circuit 27, the analog-digital converter 29 or the like shown in FIGS. 10(A) and (B). The peak sample hold circuits 36 are controlled by a S/H control circuit 37. As for automatic gain control, this is the same as that in FIG. 9.

In addition, if the peak sample hold circuits shown in FIG. 12(B) are used, the detection circuit 24 shown in FIG. 11 can be omitted.

Figure 13:
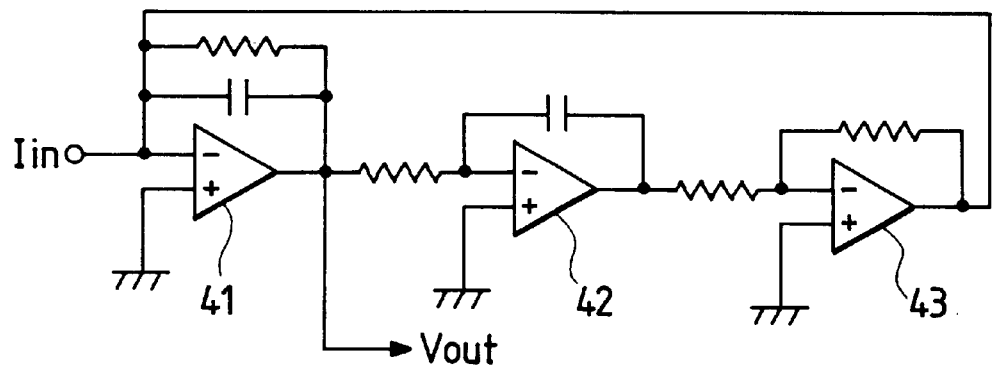
FIG. 13 is a circuit diagram showing a case that a current-voltage converter and a filter are combined in a body.

Further, through supplying the current that is each light received output from the divided light receiving portions to the circuit shown in FIG. 13, this circuit can perform the filtering function as well as the current-voltage conversion. Using this circuit, in the circuits shown in FIG. 9 and FIG. 11, the current-voltage converter 21 and band-pass filter 22 can be combined in one body, and it is possible to simplify the circuit structure.

Figure 14:
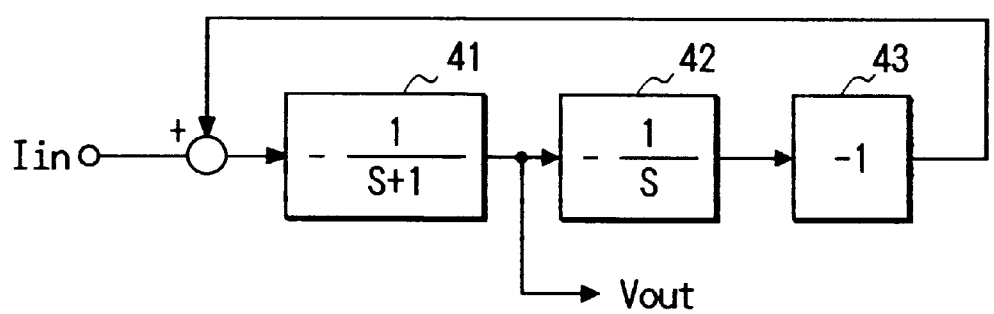
FIG. 14 is a block diagram showing the circuit structure of FIG. 13.
Figure 15:
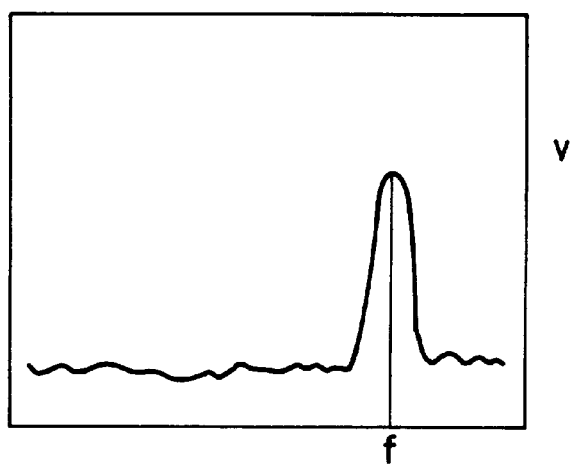
FIG. 15 is a frequency characteristic diagram of the detected voltage in case of using the circuit in FIG. 13.

FIG. 14 is a block diagram shown in FIG. 13, and s is a Laplacian. This circuits are composed of a inverted incomplete integration circuit 41, inverted integration circuit 42, and inversion circuit 43. If the detected current from the divided light receiving portion is inputted, it is filtered in the current state, and this circuit can take out the high level of voltage output at the used frequency shown in FIG. 15.

Using this circuit, it becomes possible to take out only the carrier component of the light source 2a with pulsed light emission without being affected from external light, and to increase the S/N ratio with the sufficient signal component.

Figure 16:
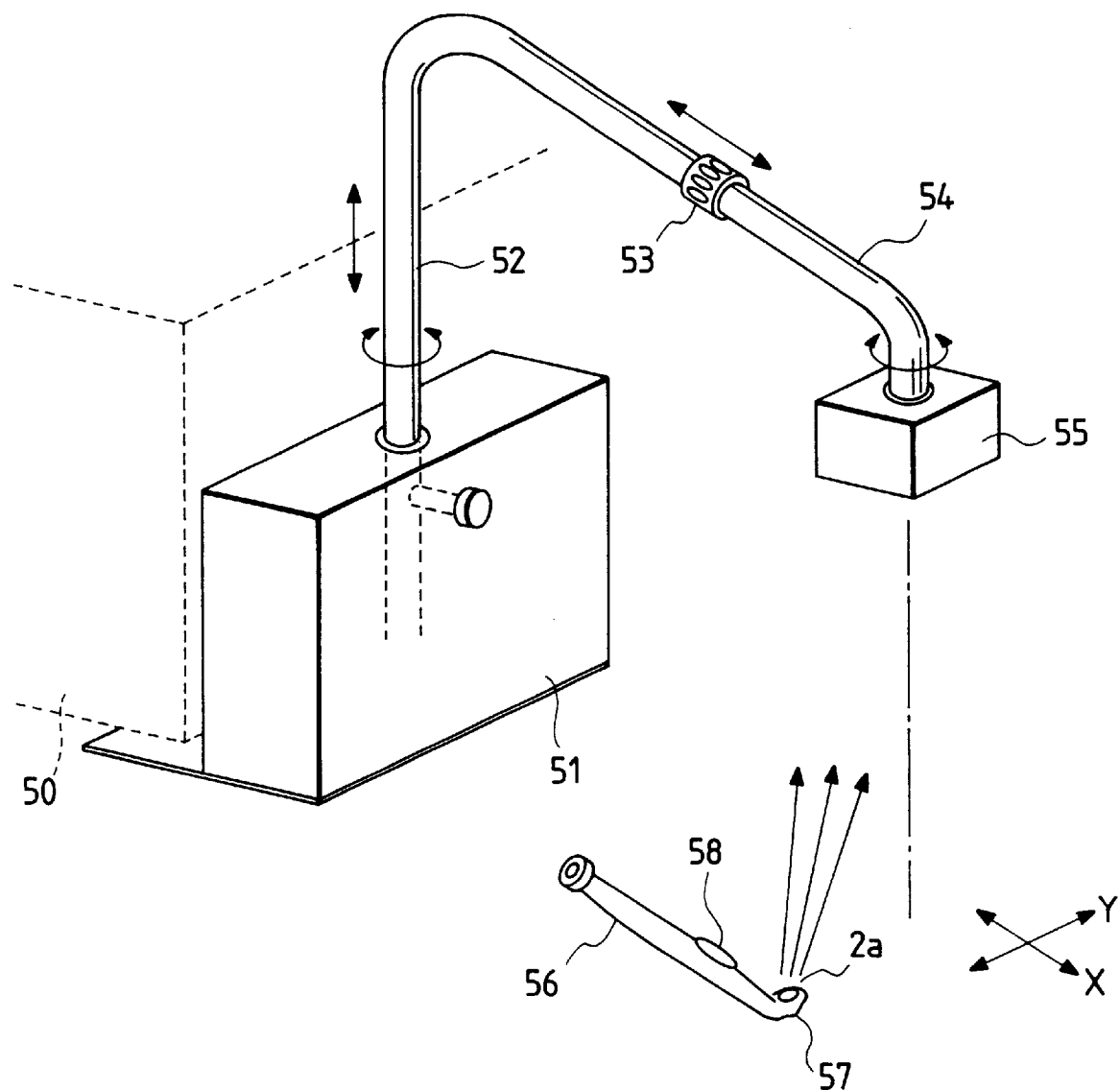
FIG. 16 is a perspective view of an apparatus appearance showing a coordinate input apparatus using an inclination detection apparatus of the present invention.
Figure 17:
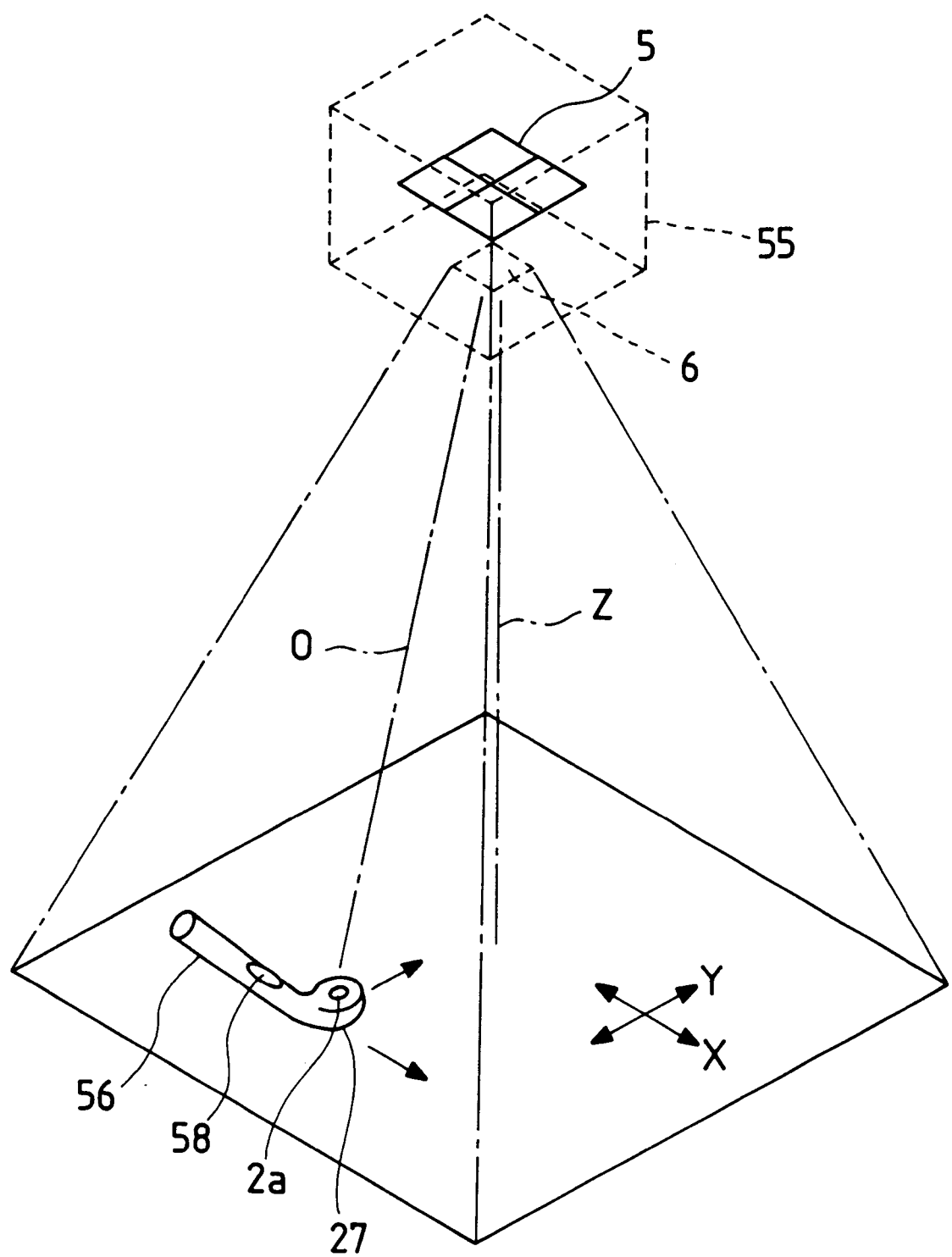
FIG. 17 is a perspective view showing a principle of a coordinate input apparatus shown in FIG. 16.
Figure 18:
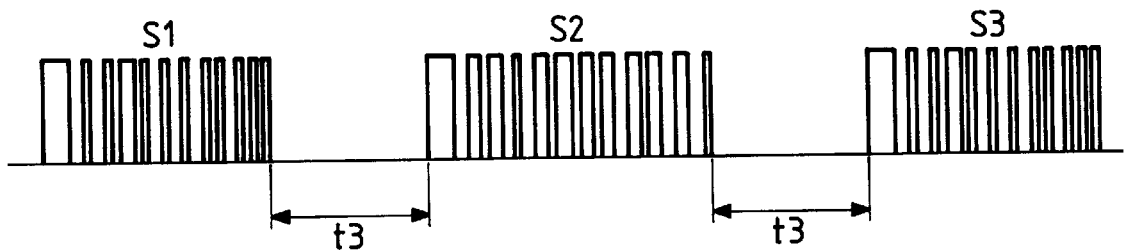
FIG. 18 is a waveform chart showing a plurality of signals transmitted in a transmitting/receiving apparatus of the present invention.

FIG. 16 to FIG. 18 show coordinate input apparatuses as other applications of the equipment using the inclination detection apparatus shown in FIG. 2, FIG. 3, and the like.

In this apparatus, as shown in FIG. 16, an attached bracket 51 is mounted near the main frame 50 of the computer. In this bracket 51, an arm 52 is attached so as to be able to adjust the rotational position, and further, at the top of the arm, a top arm 54 is attached through a length-adjustable portion 53.

In addition, at the top arm 54, an inclination detection apparatus 55 is mounted. As shown in FIG. 18, this inclination detection apparatus 55, similarly to those shown in FIG. 2 and FIG. 3, is composed of an iris section 6 having a rectangular opening, and a four-divided light receiving portions 5 positioning inside it.

On the other hand, the light source 2a emitting the infrared reference light is mounted upward on the top of the coordinate input pen 56. As shown in FIG. 18, moving this coordinate input pen 56 against the table surface, the inclination angle of the line O connecting this light source 2a and the iris portion 6 to the Z-axis is detected. Through converting this detected angle to X-Y coordinate components, the input of the plane coordinates with movement of the coordinate input pen 56 becomes possible. Further, in this embodiment, click switches 57 and 58 are provided at the coordinate input pen 56. These click switches 57 and 58 are to instruct start/release of the coordinate input against the computer. One click switch 57 is activated with depressing to a plane, and the other click switch 58 is operated with a finger.

Subsequently, a transmitting/receiving apparatus according to the tenth embodiment of the present invention will be described with reference to drawings.

The transmitting/receiving apparatus, for example, as shown in FIG. 1 to FIG. 2, is used to transmit information from the input apparatus 3 to the main frame of the apparatus having the screen 1.

In the input apparatus 3, click switches, other operation switches (operation members), and the like are provided, and operation information (operation signals and operation data) are also transmitted to the main frame of the apparatus. Owing to this, for example, through moving the cursor mark 8 to an optional position on the screen 1, and then, operating a switch of the input apparatus 3, the ON/OFF input to the switch mark displayed on the screen 1 becomes possible.

Figure 25:
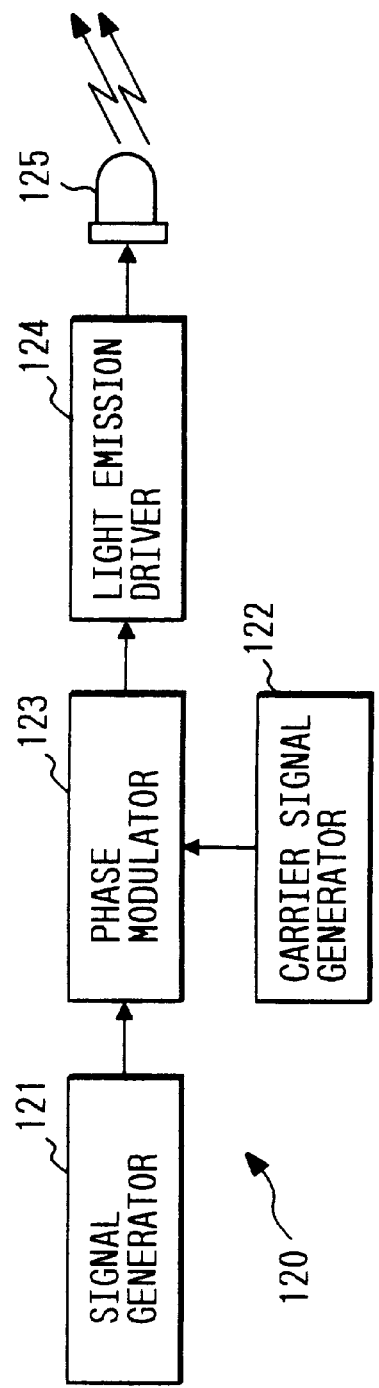
FIG. 25 is a block diagram showing the structure of a transmitting apparatus.

FIG. 25 is a block diagram showing the transmitting apparatus 120 provided in the input apparatus 3 side.

In the transmitting apparatus 120, a signal generator 121 is provided. Based on the received light signals of said four-divided light receiving portions 5a, 5b, 5c, and 5d, the calculation is performed at the arithmetic circuit in the input apparatus 3, information relating to X-Y coordinates of the screen 1, and on the basis of this information, transferred data are formatted at the signal generator. A carrier signal generator 122 has an oscillation circuit, a frequency dividing circuit, and the like, and a carrier signal with a regular frequency is generated. At a phase modulator 123, said carrier signal is modulated with said transferred data, and consequently, the phase-modulated transmitted signal is generated. In addition, it is possible to directly generate said transmitted signal with the microcomputer used for angle calculation. Based on this transmitted signal, an infrared light emitting element 125 is driven at a light emission driver 124, and a infrared transmitted signal is transmitted to the main frame of the apparatus.

Figure 26:
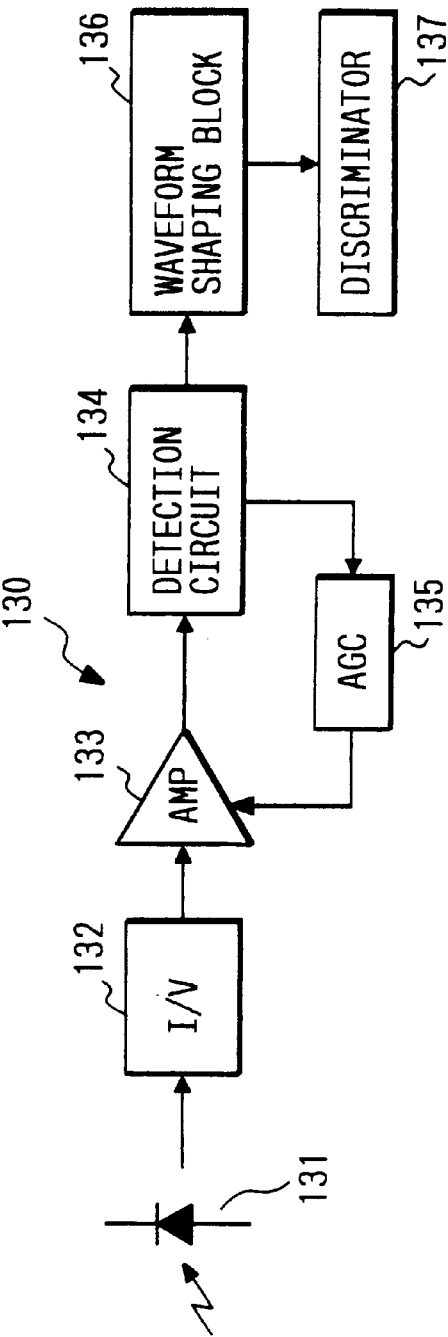
FIG. 26 is a block diagram showing the structure of a receiving apparatus.

FIG. 26 is a block diagram showing the structure of a receiving apparatus 130 provided in the main frame side of the apparatus having the screen 1.

This receiving apparatus 130 comprises a light receiving element 131 for receiving the signal transmitted from said transmitting apparatus 120 via infrared rays, a current-voltage converter 132 for converting the detected current performed photoelectric transfer at this light receiving element 131 to the voltage, an amplifier 133 for amplifying said voltage, a detection circuit 134 to remove the carrier signal component from said voltage, and an AGC (automatic gain control) block 135 for controlling the amplitude gain of the amplifier 133 on the basis of the detected output at the detection circuit 134. The voltage waveform detected at said detection circuit 134 is made waveform shaping of at a waveform shaping block 136, and is sent to a discriminator 137.

The discriminator 137 is mainly composed of a CPU of a microcomputer and the like, and based on the period of the clock signal from a built-in or external clock generator, the time of the high level, time of the low level, or period of the waveform-shaped rectangular wave is measured. Further, at the discriminator, the sort "1" and "0" of a binary signal is discriminated on the basis of this measured value.

Figure 22:
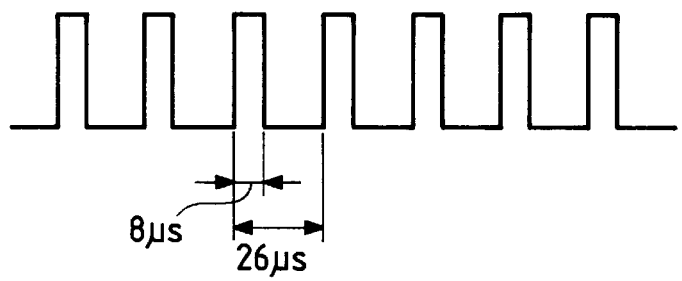
FIG. 22 is a waveform chart of a carrier signal.

FIG. 22 shows a carrier signal (carrier wave) generated with the carrier generator 122. The carrier signal is the same as one used in an infrared receiving unit used in a conventional home electric appliance and the like, and, for example, its frequency is fc=38.46 kHz and its duty ratio is 0.31.

Encoding of a transmitted signal in this embodiment will be described.

Figure 23:
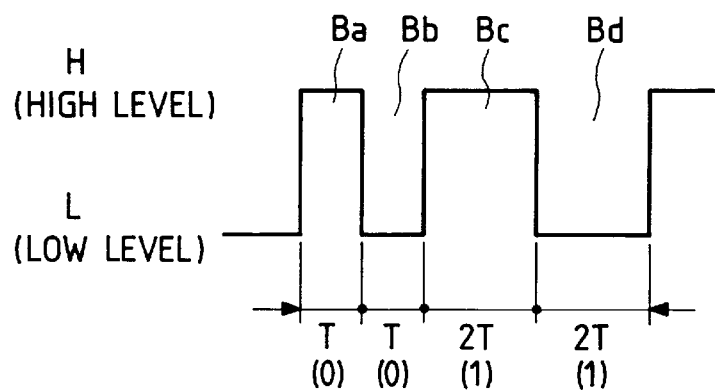
FIG. 23 is a waveform chart explaining coding of each bit.

As shown in FIG. 23, in the transmitted signal, each of a high level (H) and a low level (L) of the phase-modulated signal becomes a unit bit, and, for example, in FIG. 23, succeeding high-level and low-level form four unit of bits Ba to Bd. Each bit expresses the sort "1" or "0" of the binary signal. At each bit of the high level and low level, if the time length is unit time T, the binary signal which the bit express is "0," and, if the time length is "2T" that is twice of the unit time T, the binary signal which the bit express is "1."

In addition, the time length that expresses "1" is not limited to "2T," and hence, if it is integer times of the unit time T, "3T," "4T", and the like are possible. In the embodiment of the FIG. 23, the sort "1" of the binary signal is expressed as "2T". Therefore, the shortest time length of each bit is "T," the longest time length is "2T", and hence, the average time length necessary to express one bit is "1.5T". The encoding in a conventional infrared transmission shown in FIG. 34, the average time length to express one bit is "3T". Therefore, assuming that time lengths of unit time T are same in FIG. 23 and FIG. 34, through using the code shown in FIG. 23, encoding efficiency can be made to be twice in comparison to the encoding shown in FIG. 34, and the transfer rate of data (signals) can be made to increase to twice.

As the most basic embodiment of the present invention, the procedure is to receive the transmitted signal from the transmitting apparatus 120 shown in FIG. 25 in the receiving apparatus 130 shown in FIG. 26 on the basis of the encoding shown in FIG. 23, to remove the carrier wave from the received signal, and to measure the time length of a high-level bit and a low-level bit of the rectangular wave at the discriminator 137 on the basis of the clock in case of discriminating the waveform-shaped rectangular wave at the discriminator 137. If the time length of each bit (Ba, Bb, ..., in FIG. 23) is "T," it can be recognized that the bit expresses "0" of the binary signal, and if the time length of each bit is "2T," it can be recognized that the bit expresses "1" of the binary signal.

In addition, in this embodiment, the unit time T in the encoding of the transmitted signal is shorten at 0.2 ms. Although, in the conventional infrared transmission/reception shown in FIG. 34, the unit time T is nearly 0.5 ms, through shortening the unit time T in this embodiment, further speed-up of the signal transfer rate can be attained. In case the unit time of the transmitted signal is shorten, in correspondence to the discrimination capability in the receiving apparatus 130, the probability of the discrimination error against each bit increases. However, in this embodiment, through measuring the time length per period the probability of the discrimination error was reduced.

Hence, at the discriminator 137 in the receiving apparatus 130 shown in FIG. 26, time lengths of two bit period of a high level and a succeeding low level and two bit period of a low level and a succeeding high level are measured. The measurement operations will be described.

Figure 19:
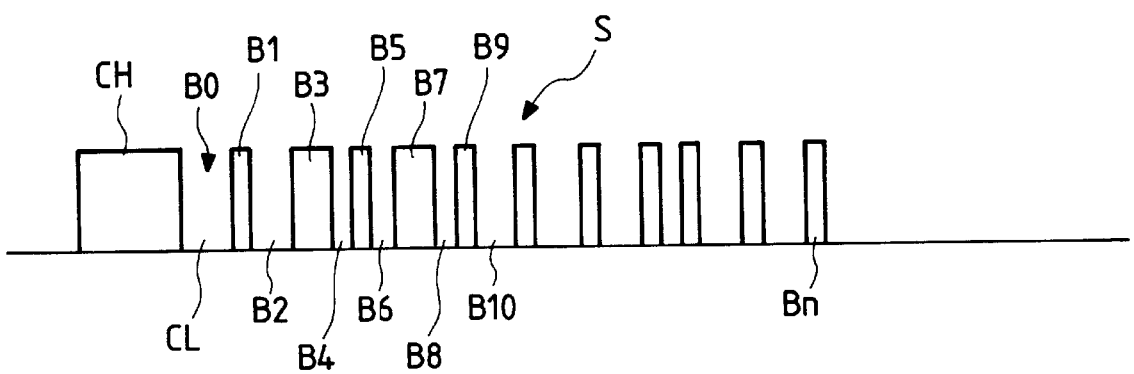
FIG. 19 is a waveform chart showing data contents of a signal group including coordinate data.
Figure 24:
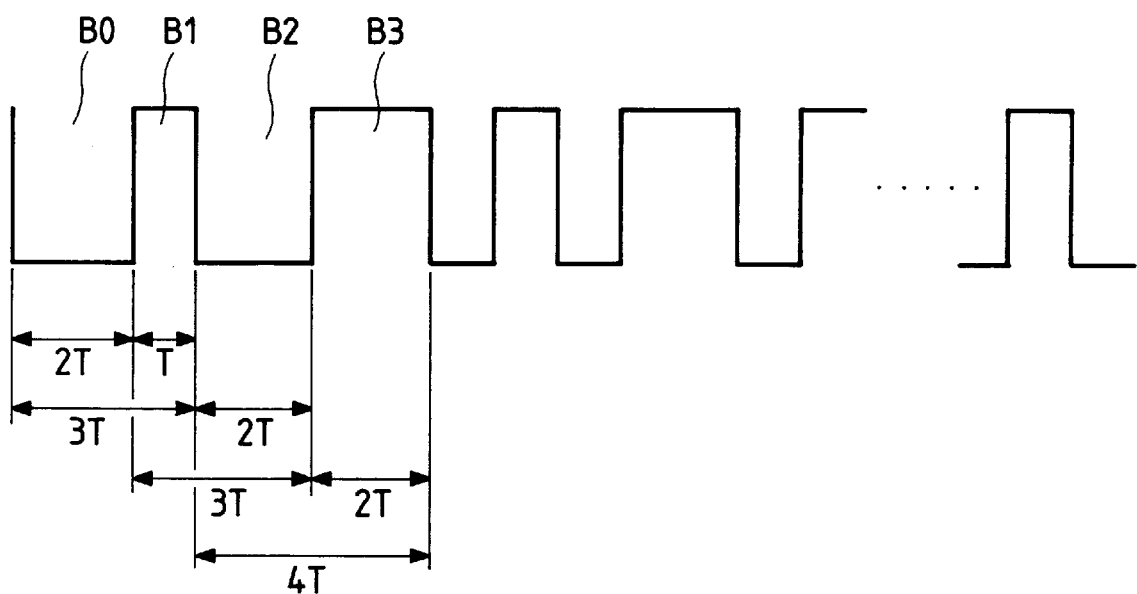
FIG. 24 is a waveform chart showing a principle for discriminating a sort of a binary signal of each bit through measuring a time length every period.

As shown in FIG. 24, it is defined that the reference bit B0 at the predetermined position in a group of signals is the time length "2T" expressing "1" of the binary signal. Although FIG. 19 shows a group of signals S (signal group) transmitted from the transmitting apparatus 120, at the top of this signal group S, leader codes CH and CL of a high level and a low level are provided respectively. The part CL of the low level of the leader codes becomes said reference bit B0, and its time length is defined as "2T."

At the discriminator 137, the period from the leading edge of the starting position of the rectangular wave to the subsequent leading edge and the period from the trailing edge to the subsequent trailing edge are measures as the time lengths. As shown in FIG. 24, a period from the starting position (trailing edge) of the reference bit B0 to the finishing position (trailing edge) of the first bit B1 is measured. If this period is "3T", and, since said reference bit B0 of the preceding stage of the period is defined as "2T", it can be discriminated that the first bit B1 of the succeeding stage of the period is the time length T, that is, "0" of the binary signal. In addition, a period from the staring position (leading edge) of the first bit B1 to the finishing position (trailing edge) of the second bit is measured. If this period is "3T", it can be discriminated that the second bit B2 is the time length "2T" and this expresses "1" of the binary signal, since it has been discriminated that the time length of the first bit B1 is T. Subsequently, the period between the bit B2 and the third bit B3 is measured. If this period is "4T," it can be discriminated that the time length of the third bit B3 is "2T" and this bit is "1" of the binary signal, since it is already know that the time length of the bit B2 is "2T". Repeating this, the time length of each bit can be accurately discriminated.

The following Table 1 shows combination of one period length between leading edges or trailing edges and the time length of the preceding bit and succeeding bit in the period. The expressions (1) and (0) in Table 1 means "1" and "0" of the binary signal respectively.

TABLE 1

| Preceding bit | Succeeding bit | Length of one period |
| --- | --- | --- |
| 1T (0) | 1T (0) | 2T |
| 1T (0) | 2T (1) | 3T |
| 2T (1) | 1T (0) | 3T |
| 2T (1) | 2T (1) | 4T |

As shown in Table 1, if "1" of the binary signal is expresses in "2T", the time lengths of one period are limited to 2T, 3T, and 4T, and combinations of bit time lengths of the preceding bit and the succeeding bit are limited to four combinations. Therefore, measurement of the period and discrimination of the time length of each bit on the basis of this measurement at the discriminator 137 are not difficult, and if these measurement and discrimination are performed with a CPU, the software becomes simple. In addition, even if the time length expressing "1" of the binary signal is not 2T but, for example, 3T, easiness of its discrimination is same. If the time length of "1" of the binary signal is "3T", in Table 1, the expression 2T is replaced to 3T, and the lengths of one period are replaced to 2T, 4T, 4T, and 6T from the upper step to the lower step.

Against individually discriminating the time length of each bit the high level and the low level, discrimination of the time length per period is easier, and has high discriminating precision. This point will be described with reference to FIGS. 27(A), (B), and (C).

In the receiving apparatus 130 shown in FIG. 26, the signal that is photoelectrically transferred and converted to the voltage with the current-voltage converter 132, is amplified with the amplifier 133, and is detected with the detection circuit 134 so that the carrier component is removed. The detected signal is approximately a sine wave shown in FIG. 27(A). Though this sine wave is made waveform shaping of with the waveform shaping block 136, this waveform shaping method is in general that a compactor is provided, the sine wave is compared with the threshold voltage value SL at the compactor, and consequently, the rectangular wave shown in FIG. 27(B) is obtained.

However, the level of the received signal is not regular, and hence, fluctuation is forecast. The AGC block 315 is provided so as to reduce this fluctuation range. However, if, for example, the time when a signal is not received with the light receiving element 131 continues, and at the time the light receiving element 131 suddenly receives a signal, there is the possibility that the phenomena that the amplification gain of the amplifier 133 is sharply controlled with the AGC block occurs, since the voltage detected with the detection circuit 131 suddenly rises. This is the same case that said threshold voltage value seemingly changes to SL' against the level of the received signal.

Figure 27A:
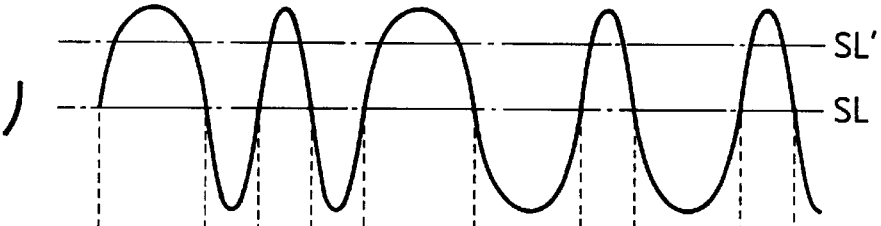
FIG. 27(A) is a waveform chart showing a received signal after detection, FIGS. 27(B) and (C) are waveform charts showing rectangular waves made waveform-shaping, FIG. 28 a plan showing an apparatus for position detection in two-dimensional coordinates as an example of a position detection apparatus of the present invention.
Figure 27B:
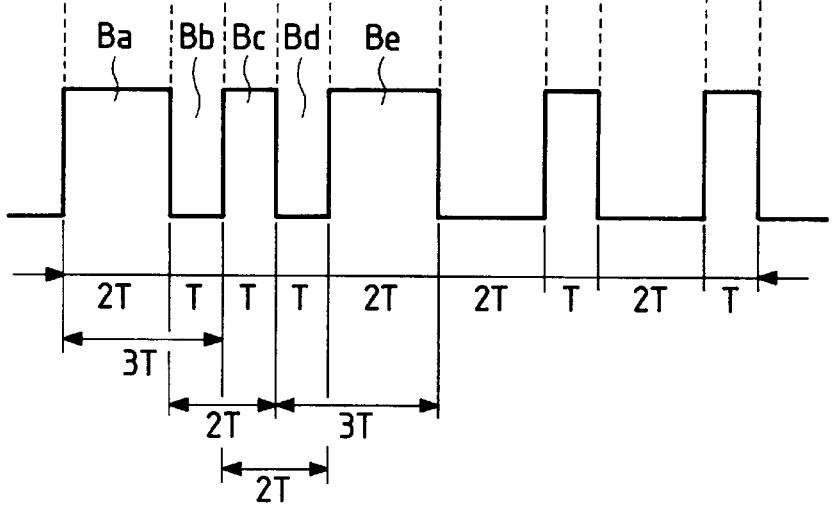

If the threshold value positions at the normal level SL against the level of the received signal in the sine wave detected in FIG. 27(A), the waveform-shaped rectangular output becomes as shown in FIG. 27(B), in this case, the time length of each bit of the high level and low level becomes 2T, T, T, T, 2T, ..., and hence, it is possible to discriminate the sort of the binary signal of each bit from the time length of each bit.

Figure 27C:
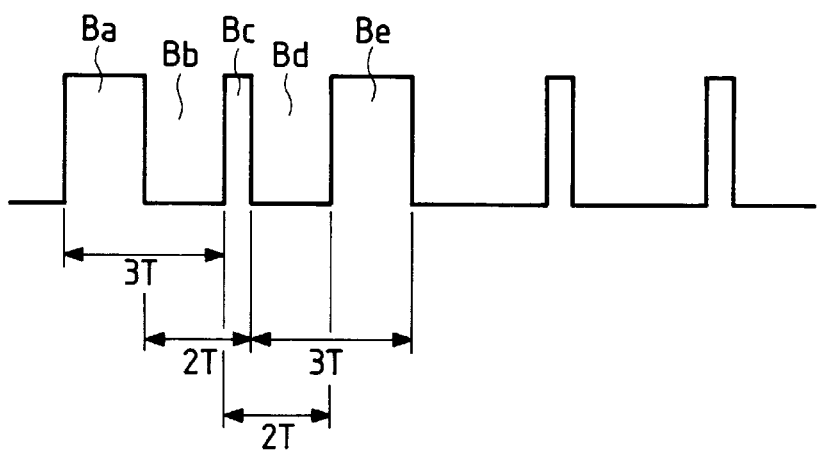

However, if, against the same received signal, the threshold value seemingly changes to the level SL', that is, the level of the received signal changes, the rectangular wave waveform-shaped through setting the threshold value SL' as the reference value becomes as shown in FIG. 27(C). In FIG. 27(C), measurement of the time length of each bit of the high level and low level causes the identification error of the bit time length. For example, in FIG. 27(B), the time lengths of the bits Bb, Bc, and Bd are T respectively, while, in FIG. 27(C), the time lengths of the bits Bb and Bd become 2T respectively.

However, looking at each one period of the continuous bits Ba and Bb of the high level and low level, in FIGSD. 27(B) and 27(C), these can be measured as "3T". Similarly, each one period of the bits Bb and Bc can be measured as "2T". Thus, if the levels of the threshold value and the received signal relatively change, the time length of each bit of the high level and low level changes, but, variance of one period length of the continuous bits of the high level and low level or the low level and high level becomes minute. Therefore, discrimination of the bit sort based on the measurement of the time length of one period can maintain remarkably high precision instead of variance of the received signal.

Figure 34A:
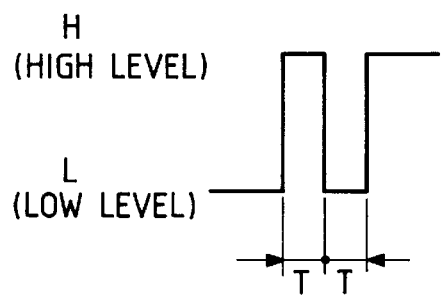
Figure 34B:
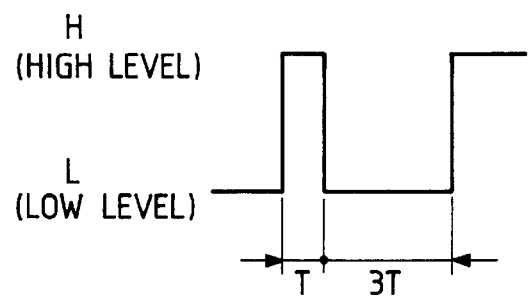

Therefore, according to the discrimination method of this embodiment, it is not necessary to dare to use an expensive and highly-precisional unit as the unit composed of from the light receiving element 131 to the waveform shaping block in the receiving apparatus side, it is possible to perform sufficient code discrimination (signal discrimination) even if a receiving unit used in a remote controller for a conventional home electric appliance that performs transmission/reception with the signal format shown in FIG. 34. Even if the unit time T is-shorten to nearly 0.2 ms, the receiving apparatus 130 using this conventional receiving unit can perform highly-precisional code discrimination.

Thus, through forming bits with each of the high level and low level of signals, this apparatus can attain the encoding efficiency that is twice efficiency of the conventional example in FIG. 34, and further, can attain to increase data (information) transfer rate through shortening the time length (pulse width) of the unit time T. Therefore, even if this apparatus uses a transmitting/receiving unit with the precision same as that of a conventional one, this can perform remarkably high transfer rate, and this can be practically used as a transmitting/receiving apparatus to transmit information of X-Y coordinates from the input apparatus 3 as shown in FIG. 1.

Further, in this embodiment, through providing two bit of parity bits in a group of signals (signal group) S shown in FIG. 19, this increases reliability of signal reception.

Figure 20:
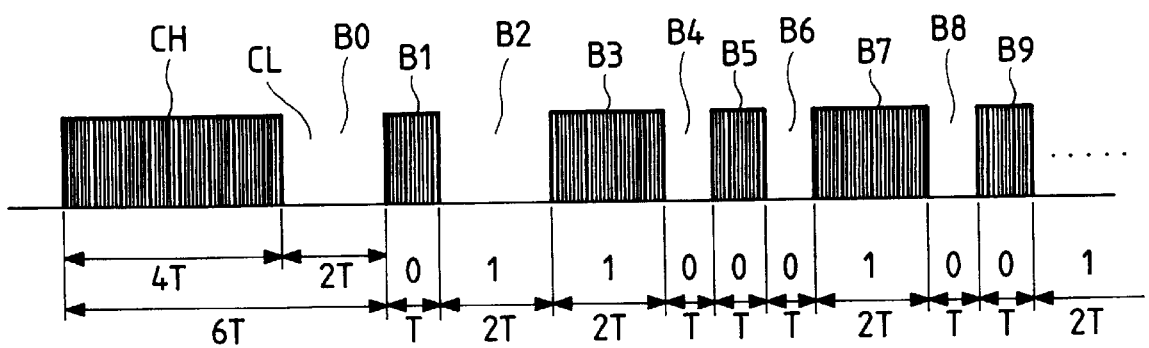
FIG. 20 is an enlarged waveform chart showing an enlarged part of the waveform in FIG. 19.

In the signal group S shown in FIG. 19 and FIG. 20, B2 and B3 are parity bits. The parity bit B2 relates to all the bits (B4, B6, . . . ) determined with the time lengths of the low level of a signal among succeeding bits. If there are an even number of bits expressing "1" of the binary signal among bits of the low level, this apparatus sets the parity bit B2 as "0" of the binary signal. In addition, if the number is odd, this apparatus sets the parity bit 92 as "1" of the binary signal. In the example of FIG. 19 and FIG. 20, since the time length of the parity bit B2 is 2T, that is, "1," the number of "1" of the bits expressed in the low level among the succeeding bits is odd.

The party bit B3 is set as "0" if the number of bits of "1" among the bits (B5, B7, . . . ) determined with the time lengths of the high level of a signal among succeeding bits is even. If it is odd, the parity bit B3 is set as "1." In the example of FIG. 19 and FIG. 20, since the time length of the parity bit B3 is 2T, that is, "1", the number of "1" of the bits expressed in the high level among the succeeding bits is odd.

Through performing the error check of received signal with these parity bits B2 and B3 at the discriminator 137, this apparatus can further increase reliability of discrimination of the received signal.

In addition, in the signal group S shown in FIG. 19, each total count of the bits of the high level and low level are odd. Assuming that the bit B1 following the leader codes CH and CL is the top bit and Bn is the final one, n is odd. Further, if the leader codes CH and CL are regarded as a bit each, the total bit count from the leader code CH to the final bit Bn of the high level is odd.

Figure 33:
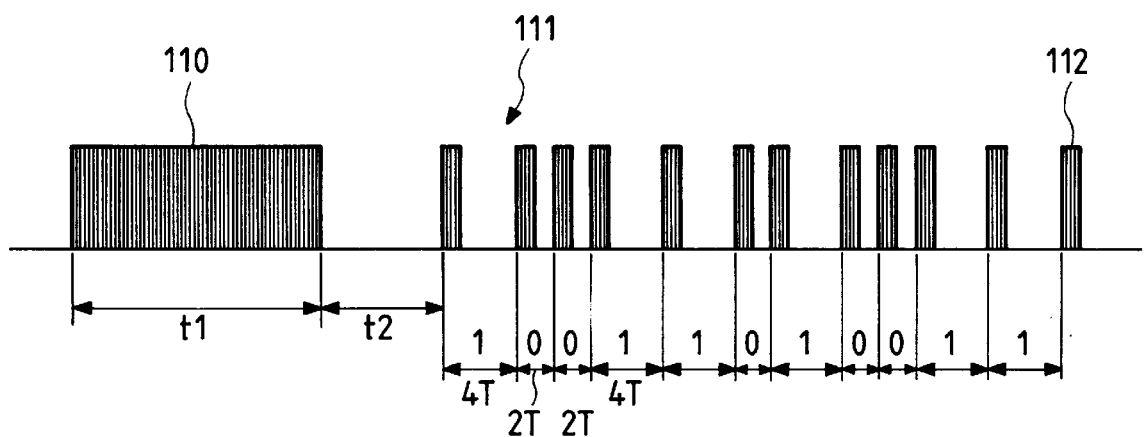
FIG. 33 is a waveform chart showing the format of signals in a conventional infrared transmitting/receiving apparatus, FIGS. 34(A) and (B) are waveform charts showing encoding used for conventional infrared transmission/reception.

In this embodiment, each of the high level and low level of a signal is defined as the unit bit. Therefore, if the total bit count is odd, the top bit and the final bit are always high level bits, and hence, it is not necessary to provide a stop bit 112 shown in FIG. 33. By the transfer time equivalent to the stop bit, transfer time is shortened, and discrimination of reception can be simplified.

Here, the format (signal contents) of a signal group S shown in FIG. 19 will be described.

The codes CH and CL of the high level and low level are leader codes, and these are the codes to make the receiving apparatus 130 recognize to be signal transmission. The bit B1 is the inversion bit to distinguish whether this signal group is composed of inverted signals or not inverted ones, B2 and B3 are above-described parity bits, and each bit from B4 to Bn means the transmitted information (transmitted data). Thus, bits B4 to Bn are the bits for data transfer. The signal group S shown in FIG. 19 shows the case that this apparatus transmits X-Y coordinate information (coordinate data) and switch information used with the coordinate data, the total bit count from B4 to Bn is 18 bits, eight bits from B6 among the bits means the position in the X-axis, and the succeeding eight bits means the position in the Y-axis. The residual two bits are switch information to show operation states of two switches mostly used with the coordinate information as click switches in a mouse.

Here, as for said inversion bit B1, if the time length of the inversion bit B1, as shown in FIG. 19 and FIG. 20, is T that means "0" of the binary signal, this means that "1" and "0" of the binary signal expressed with each succeeding bit should be recognized without inversion. If the time length of the inversion bit B1 is 2T which means "1" of the binary signal, this means that the binary signal expressed with each succeeding bit are the transfer data inverted the codes "1" and "0". At the discriminator 137 of the transmitting apparatus 130 shown in FIG. 26, if the inversion bit B1 is "1", exclusive OR of the binary signal expressed with succeeding bits in the signal group S is calculated, the signal mutually inverted the codes "1" and "0" of the binary signal is restored.

As shown in FIG. 18, although groups of signals (signal groups) S1, S2, S3, . . . , are intermittently transmitted in sequence with a predetermined interval t3 (for example, 4 ms) from the transmitting apparatus 120 to the receiving apparatus 130, the expression of the binary signal of each bit after the inversion bit B1 of each signal group is regularly repeated as S1 is not inverted, S2 is inverted, S3 is not inverted, S4 is inverted and so on, that is, an inverted signal group and a not inverted signal group are regularly repeated alternately per signal group.

Because of this, transmission time of data in a set of plural signal groups can be shortened. For example, if each bit of eighteen bits from the bit B4 to the bit Bn has the time length T, that is, "0" of the binary signal, the total time length of the signal group S becomes the shortest, but, if all bits have the time length 2T, that is , "1" of the binary signal each, the total time length of the signal group S becomes the longest. For example, supposing that this longest signal group is intermittently transmitted with the space time t3, it is necessary to secure a long time margin for data processing in the transmitting apparatus 120 and the receiving apparatus 30, in particular, for data processing in the receiving apparatus 130 where it is necessary that the data processing time matches said longest time length.

However, as above-described, the binary signal expressed with each bit of the signal group S1, S2, S3, . . . , intermittently transmitted in sequence is repeated per signal group as a signal group is inverted and the subsequent signal group is not inverted, and if coordinate data that all bits become "1" are transmitted as S1, S2, S3, . . . , in the inverted signal group, all bits of the transmitted signal become "0" of the binary signal so that the total time length of all bits becomes short. Therefore, since the longest signal group and the shortest signal group are alternately transmitted per signal group, considering a predetermined number of signal group set, the total processing time of this sets can be shortened.

Describing further in detail, if X-Y coordinate information (data) is transferred from the input apparatus 3 as shown in FIG. 1 to the main frame of the apparatus, at some coordinate position, the time length of the signal group S becomes short due to many "0" of the binary signal among said sixteen bit signal expressing X-Y coordinates, while at another position the time length of the signal group S becomes long due to many "1" of the binary signal among said sixteen bit signal expressing X-Y coordinates. However, as above-described embodiment, if the binary signal expressing X-Y coordinates is repeated per signal group S as a signal group is inverted and the subsequent signal group is not inverted, the time length of the entire sets is averaged, regarding them as a set of the predetermined number of signal groups at each X-Y coordinate position.

Therefore, at the discriminator 137 of the receiving apparatus 130, other arithmetic processing circuits of the main frame of the apparatus or the like, since signal groups with the longest time length are not continuously sent, it is not necessary to secure a long time margin. In addition, since during movement of the Z-axis of the input apparatus 3, the time lengths of the predetermined number of sets of the signal groups are averaged, it becomes possible to execute data processing efficiently.

Further, the advantage of performing inversion/non inversion is not limited to the case that as above-described embodiment, each of the high level and low level of a signal is defined as a unit bit, this is effective similarly to the transmission/reception of a signal having a conventional encoded format shown in FIG. 34.

Furthermore, in case a signal group inverted codes "1" and "0" of data to be transferred and a signal group not inverted are regularly repeated, it is preferable to repeat inversion and non inversion alternately per signal group as above described, but, for example, it is possible to repeat inversion and non inversion alternately per two or three signal groups, or it is possible to combine two signal group in non inversion and a signal group in inversion. However, in order to average the total transfer time of sets of plural signal groups, it is preferable to include the same number of signal groups with inverted data and signal groups with not inverted data against the set of the predetermined number of signal groups.

In the signal group S shown in FIG. 19 and FIG. 20, the eighteen bits from the bit B4 to the bit B*n* are bits for data transfer, and positional information of X-Y coordinates (coordinate data) and the like are given by these eighteen bits. In these eighteen bits, though only the minimum (two bits) switch operation signals used with the coordinate data are included, the operation signals that express operations of other various switches in the input apparatus 3 are not included. In this manner, since trough including only the minimum (two bits) data in the signal groups S1, S2, S3, . . . , sequentially transmitted, the coordinate data become the subject in the signal groups, the time length per signal group can be shortened, and the resolution of transmission/reception of coordinate data sequentially changing in the time when the Z-axis of the input apparatus 3 is made to move can be increased.

However, it is also necessary to send information on switch operations from the input apparatus 3 to the main frame of the apparatus. Then, in this embodiment, when any operation switch or other operation members in the input apparatus 3 is operated, a signal group S*a* including the data relating to operation information (operation signal) is sent. Thus, when the Z-axis of the input apparatus 3 is made to move, signal groups, where X-Y coordinate data in eighteen bits from the bit B4 to the bit B*n* are the subject, are sent as S1, S2, S3, . . . , and in this time, if an operation member of the input apparatus 3 is operated, the signal group S*a*, where operation data in 18 or 16 bits including the data relation to operation information are the subject, is inserted among said signal groups S1, S2, and S3, and is transmitted in a same interval t3. As for a ratio of signal groups on coordinate data to signal groups on operation information in this time, both signal groups can be transmitted alternately, and the signal groups can be also transmitted in the ratio of two or three signal groups on the coordinate data to one signal group S*a* on the operation data.

Here, signal contents of the signal group S*a* including the operation data are substantially same as that of the signal group S shown in FIG. 19, include the inversion bit B1, parity bits B2 and B3, and further include the operation data replaced from the coordinate data in the eighteen bits from B4 to B*n*.

Figure 21:
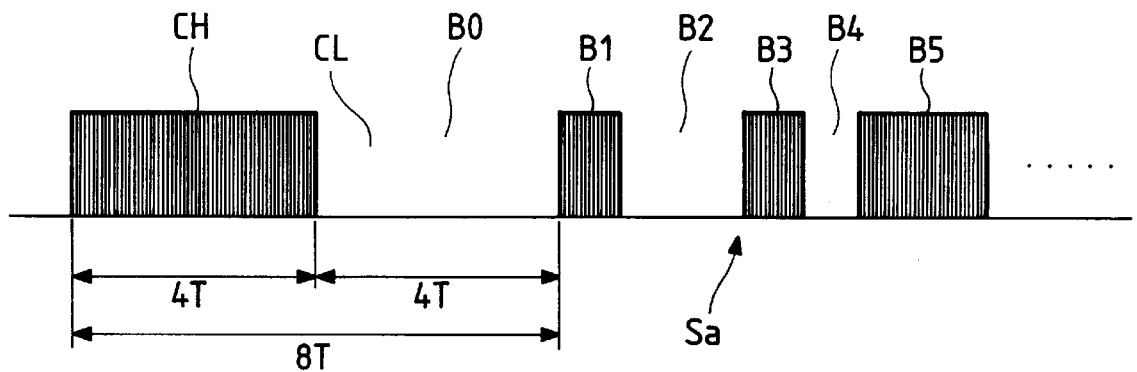
FIG. 21 is an enlarged waveform chart showing a part of transmitted signal groups including data relating to operation signals.

However, it is necessary to recognize in the receiving apparatus 130 and the main frame of the apparatus whether the transmitted signal groups are the signals relating to the coordinate data or operation data. For its recognition, as shown in FIG. 19 and FIG. 20, if they are the signal groups to transmit the data relating to X-Y coordinates, the time length of the high level CH of the leader code is set as 4T, the time length of the low level CL is set as 2T. In addition, if they are, as shown in FIG. 21, the signal group S*a* including the data relating to operation signals, the time length of the high level CH of the leader code is set as 4T, the time length of the low level CL is set as 4T. At the discriminator 137 of the receiving apparatus 130 or arithmetic processing section in the main frame of the apparatus, through measuring whether the time length of the low level CL of said leader code is 2T or 4T, whether they are the signal groups relating to the coordinate data or signal groups relating to the operation data is recognized.

In addition, as above described, in case the signal groups are discriminated through measuring the time length of one period of the high level and the low level at the discriminator 137, the time length of one period of the leader code composed of CH and CL is measured at the discriminator 137. Both of the time lengths of the high level CH of the leader code in the signal groups on the coordinate data and signal groups on the operation signals are 4T. Therefore, through measuring the period of CH and CL, if this is 6T, it can be discriminated that CL is 2T, and if this is 8T, it can be discriminated that CL is 4T.

In the signal group S*a* on the operation signals shown in FIG. 21, the time length of CL is recognized as 4T, and through measuring the period of this CL and the subsequent bit B1, the time length of the bit B1 can be known. Thus, also in this case, CL becomes the reference bit B0 for period measurement.

Further, in the signal group S (S1, S2, S3, . . . ) transmitting coordinate data, it is possible that this apparatus have bits for operation signals of the operation members with high utilization in the input apparatus 3, with coordinate data in the sixteen bits from B4 to Bn except B4 and B5 (or more increased bits), transmits the operation signals with high utilization with the coordinate data, and transmits the operation signals with another signal group Sa shown in FIG. 21 when the operation member with low utilization is operated.

Still more, since a transmitting/receiving apparatus of the present invention is not limited to transmission/reception of the coordinate data and operation data from the input apparatus 3 to the main frame of the apparatus as shown in FIG. 1 and the like, this apparatus can be used as a transmitting/receiving apparatus for remote operation and the like of other apparatuses. In addition, it is possible to use optical communication or radio wave communication besides infrared rays for transmission and reception.

Next, an input apparatus or a position detection apparatus according to another embodiment of the present invention will be described with reference to drawings.

Figure 28:
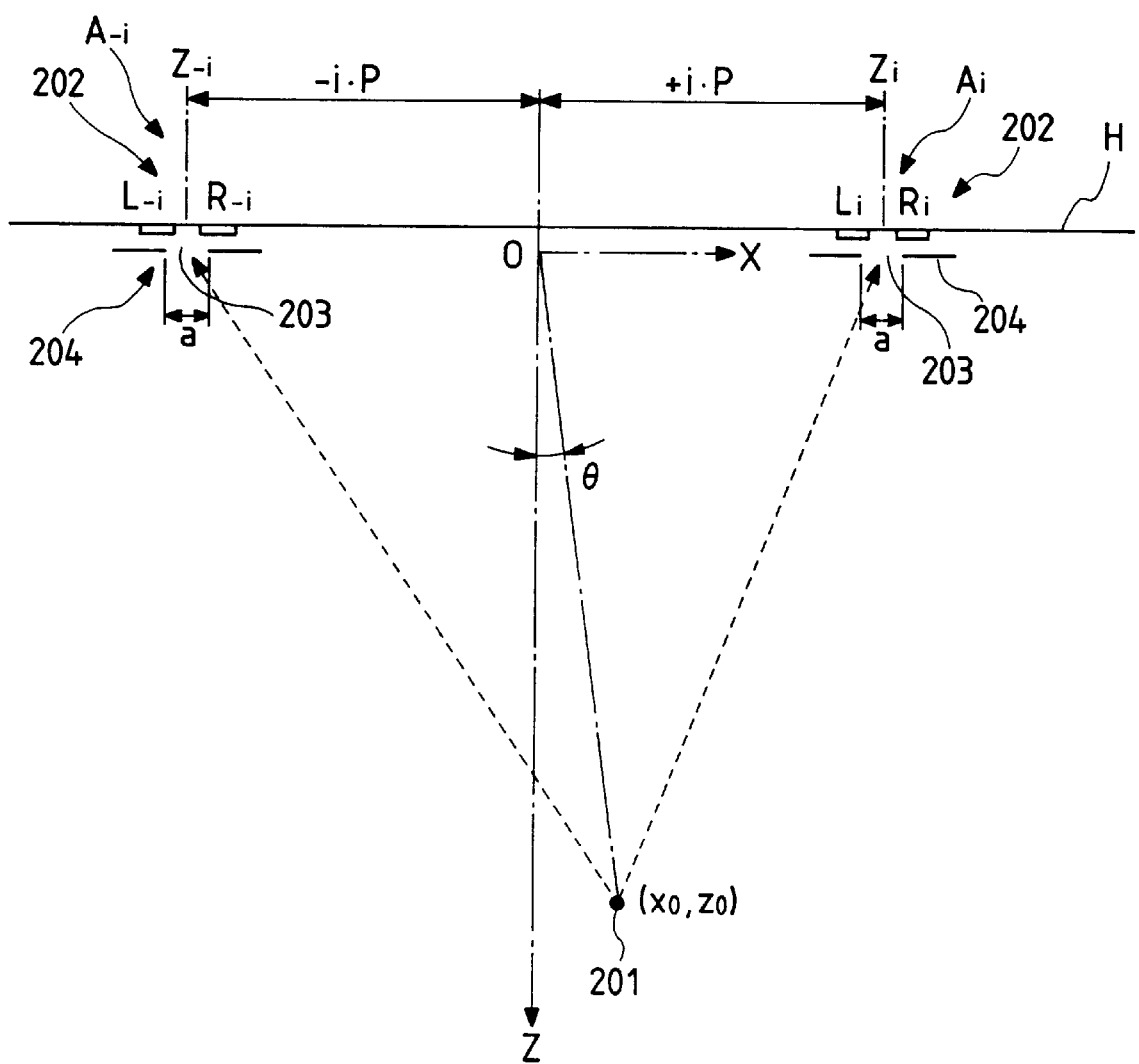
Figure 29:
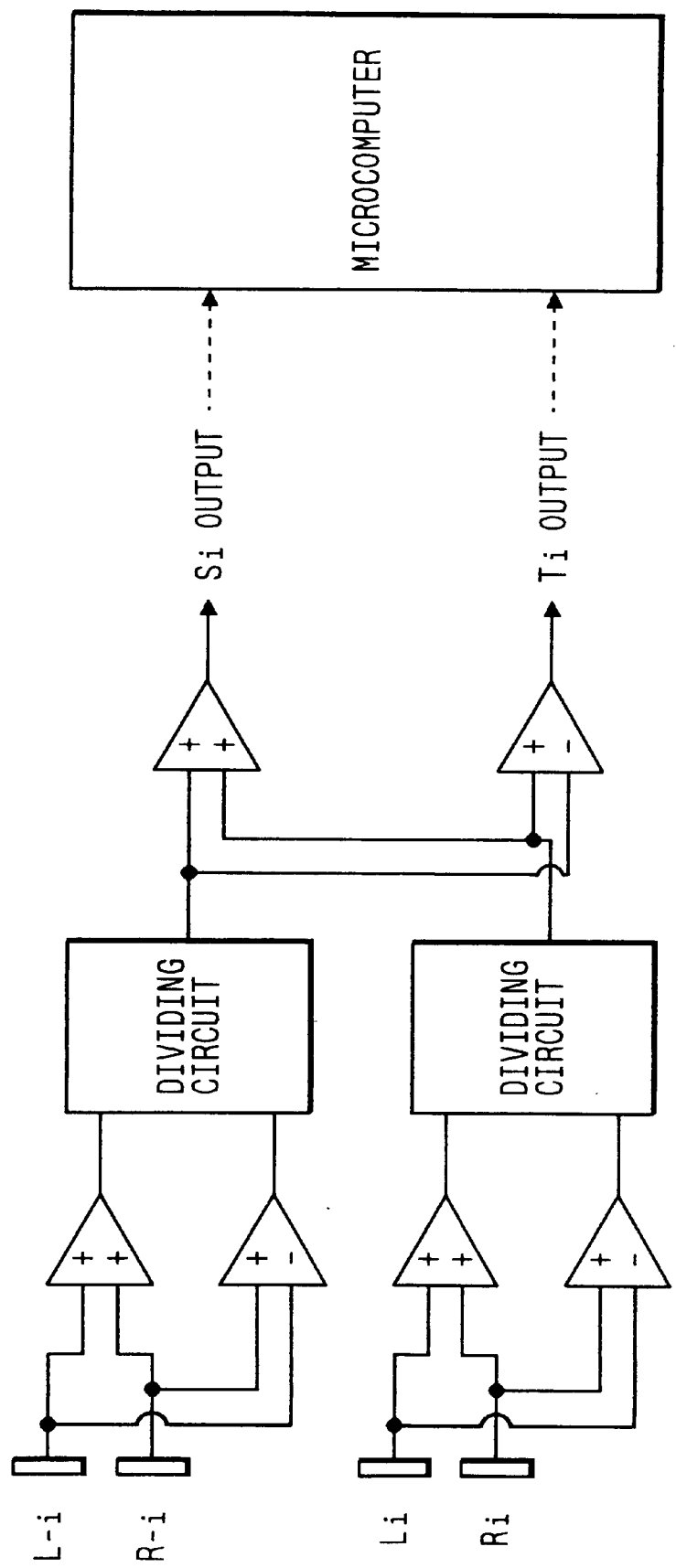
FIG. 29 is a block diagram of a processing circuit of a detected output from the position detection apparatus shown in FIG. 28.
Figure 30:
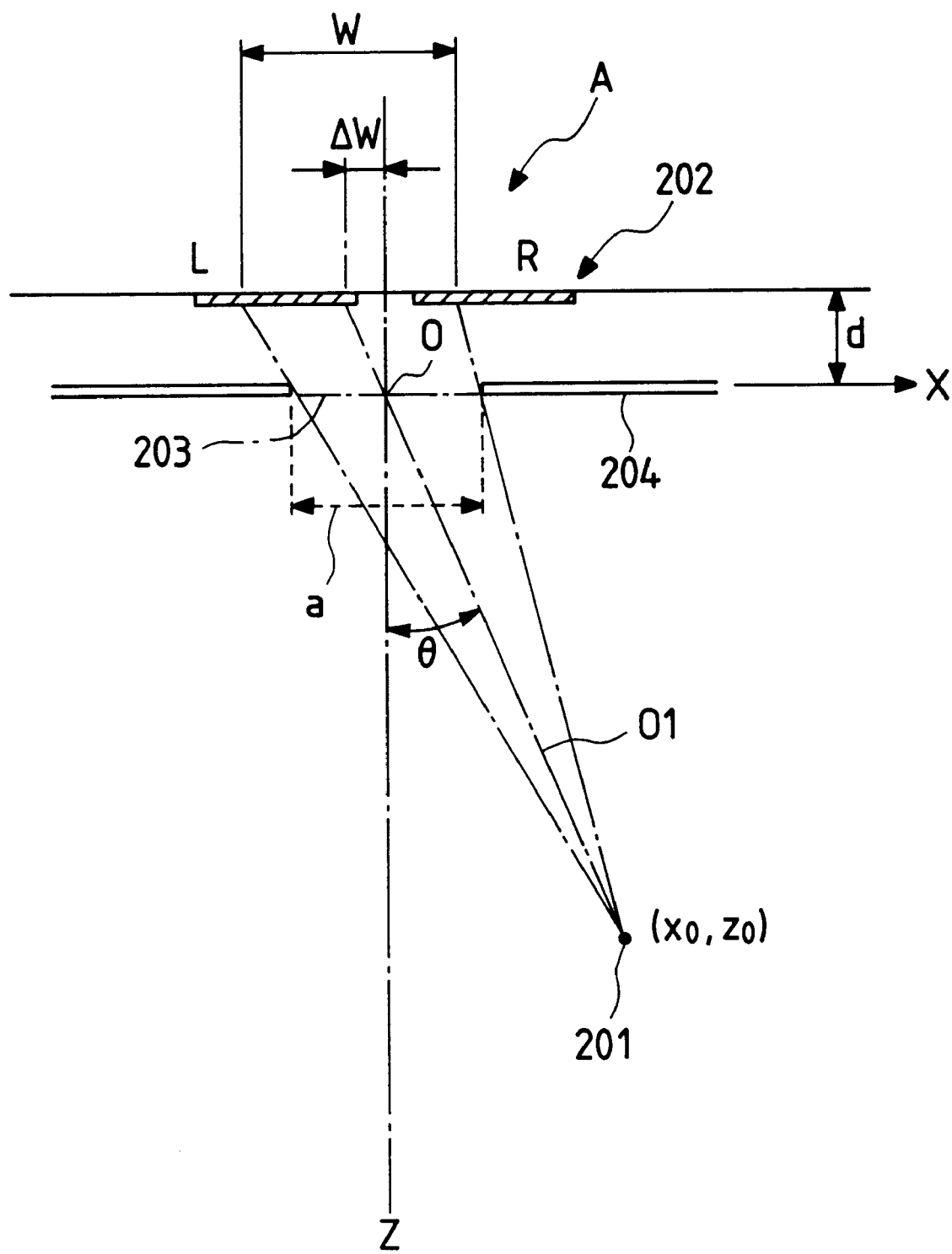
FIG. 30 is an enlarged plan explaining detection operations in a detecting section.

FIG. 28 is a plan showing the fundamental structure of a position detection apparatus according to the present invention, FIG. 29 is a block diagram of its detecting section, and FIG. 30 is a plan showing the enlarged structure of the detection circuit.

Since the position detection apparatus shown in FIG. 28 detects a position of a moving light source 201 on the X-Z two-dimensional coordinates, this is applicable to, for example, a two-dimensional input device to a computer, detection of moving targets in a factory, a game machine, and the like.

On the X-Z two-dimensional coordinates, the moving light source 201 is provided. This moving light source 201 emits pulsed infrared rays. For example, in case of the two-dimensional input device to a computer, this moving light source 201 is provided at the top of a pen and the like. In FIG. 28, the position of the moving light source 201 is shown as $(x_0, Z_0)$.

Defining a plane perpendicular to the X-Z coordinate plane and extending toward the X-axis as H, on this plane H, a pair of detecting section $A_i$ and $A_{-i}$ are disposed. It is defined that a distance between the origin 0 of the X-axis and the detecting section $A_i$ is +i£p, and a distance between the origin 0 of the X-axis and the detecting section $A_{-i}$ is —i£p, where i is an integer, and p is a distance in a predetermined unit.

At each of the detecting sections $A_i$ and $A_{-i}$, a divided light receiving portion 202 divided along the X-axis direction is provided, and at its front, an iris member 204 having an opening 203 with a regular width a is provided. It is defined that received light outputs from each light receiving element of the divided light receiving portion 202 at the detecting section $A_i$ are $R_i$ and $L_i$, and received light outputs from each light receiving element of the divided light receiving portion 202 at the detecting section $A_{-i}$ are $R_{-i}$ and $L_{-i}$. In addition, each divided light receiving portion 202 of both detecting sections $A_i$ and $A_{-i}$ is located on the same plane H.

At first, light detecting operation from the moving light source 201 at the detecting section A will be described with reference to FIG. 30.

FIG. 30 shows the case that the center of the detecting section A positions on the origin 0 of the X-axis. In addition, it is defined that the coordinate of the moving light source 201 is $(x_0, Z_0)$.

It is defined that the opening size of the X-axis component of the opening 203 at the iris member 204 is a, the distance between the iris member 204 and divided light receiving portion 202 is d. The positioning error against the Z-axis at the position where the center line O1 of the light that connects the moving light source 201 to the origin 0 of the X-axis and extends to the divided light receiving portion 202 is intercepted, is defined as Δw. In addition, the width of the spot in the X-axis direction which the light that passed through the opening 203 and radiates the divided light receiving portion 202 forms on the divided light receiving portion 202, is defined as w.

From the similarity formula of a triangle, $$w = a\{(z0+d)/z_0\} \quad (12)$$

is obtained. Since the variable d is minute against $z_0$, the fraction of the right-hand side of the expression (12) is nearly 1, and hence, $$w \cong a \quad (13)$$

is obtained.

Similarly, from the similarity formula of a triangle, $$\Delta w = x0 \cdot d/z_0 \quad (14)$$

is obtained.

The received light outputs at each light receiving element of the divided light receiving portion 202 are defined as R and L. The sum of both received light outputs (R+L) is proportional to the spot width W. The received light output R at one light receiving element is proportional to $\{(w/2)-\Delta w\}$, and the received light output R at another light receiving element is proportional to $\{(w/2)+\Delta w\}$. From these relations, $$(R-L)/(R+L) = \{(w/2-\Delta w)-(w/2+\Delta w)\}/w \quad (15)$$
$$= -2\Delta w/w$$

is obtained. Substituting said expression (13) and expression (14) for the expression (15), $$(R-L)/(R+L) \cong (2d/a)(x_0/z_0) \quad (16)$$

is obtained. In the expression (16), (2d/a) is a constant. And $(x_0/z_0)$ is tan θ.

Here, above calculations are applied to FIG. 28.

Since the central axis $Z_i$ of the detecting section $A_i$ shown in FIG. 28 moves against the origin 0 of the X-axis in FIG. 30 toward X-axis by (+i·p), in the expression (16), $(x_0)$ is replaced to $(-i \cdot p + x_0)$ so that $(R_i-L_i)/(R_i+L_i)$ is obtained. Thus, $$(R_i-L_i)/(R_i+L_i) \cong (2d/a)\{(x_0-i \cdot p)/z_0\} \quad (17)$$

is obtained. In addition, since the central axis $Z_{-i}$ of the detecting section $A_{-i}$ moves against the origin 0 of the X-axis in FIG. 30 toward X-axis by (−i·p), similarly, $$(R_{-i}-L_{-i})/(R_{-i}+L_{-i}) \cong (2d/a)\{(x_0+i \cdot p)/z_0\} \quad (18)$$

is obtained. Defining the sum of the expression (17) and expression (18) as $S_i$, then $$S_i = (R_i - L_i)/(R_i + L_i) + (R_{-i} - L_{-i})/(R_{-i} + L_{-i}) \quad (19)$$

$$= (4d/a)(x_0/z_0)$$

is obtained. In addition, defining the subtraction of the expression (18) from the expression (17) as $T_i$, then $$T_i = (R_i - L_i)/(R_i + L_i) - (R_{-i} - L_{-i})/(R_{-i} + L_{-i}) \quad (20)$$

$$= -(4d \cdot i \cdot p/a)(1/z_0)$$

is obtained.

These $S_i$ and $T_i$ are obtained from the circuit shown in FIG. 29. These outputs are supplied to the microcomputer, and the coordinate ($x_0$, $z_0$) of the moving light source 201 is calculated. This calculation will be described below.

At $S_i$ obtained in the expression (19), (4d/a) is a constant, and ($x_0/z_0$) is tan θ. At $T_i$, obtained in the expression (20), (4d·i·p/a) is a constant, and a variable on the coordinate is only (1/$z_0$).

Therefore, through program calculation in the microcomputer, at first, the position $Z_0$ on the Z coordinate of the moving light source 201 is obtained from $T_i$, and from this and Si the position $x_0$ on the X coordinate is obtained. As above expressions, only through the calculation of addition, subtraction, multiplication, and division, the position of the moving light source 201 on the two-dimensional coordinates can be obtained. Since the calculation of trigonometric functions is not necessary, the software for the microcomputer becomes simple, and the load on the circuit becomes extremely light.

The present invention, as shown in FIG. 28, can calculate the coordinate ($x_0$, $z_0$) of the moving light source 201 only through providing a pair of the detecting section $A_i$ and $A_{-i}$. However, if the detecting sections are only one pair, fluctuation of the light spot emitting the divided light receiving portion 202 and variance of light receiving precision of the divided light receiving portion 202 directly appears as a calculation error of the coordinate position of the moving light source. Then, in order to perform the positional detection in further high precision, as shown in FIG. 31, it is preferable to provide a plurality of paired detecting sections on the plane H extending along the X-axis.

Figure 31:
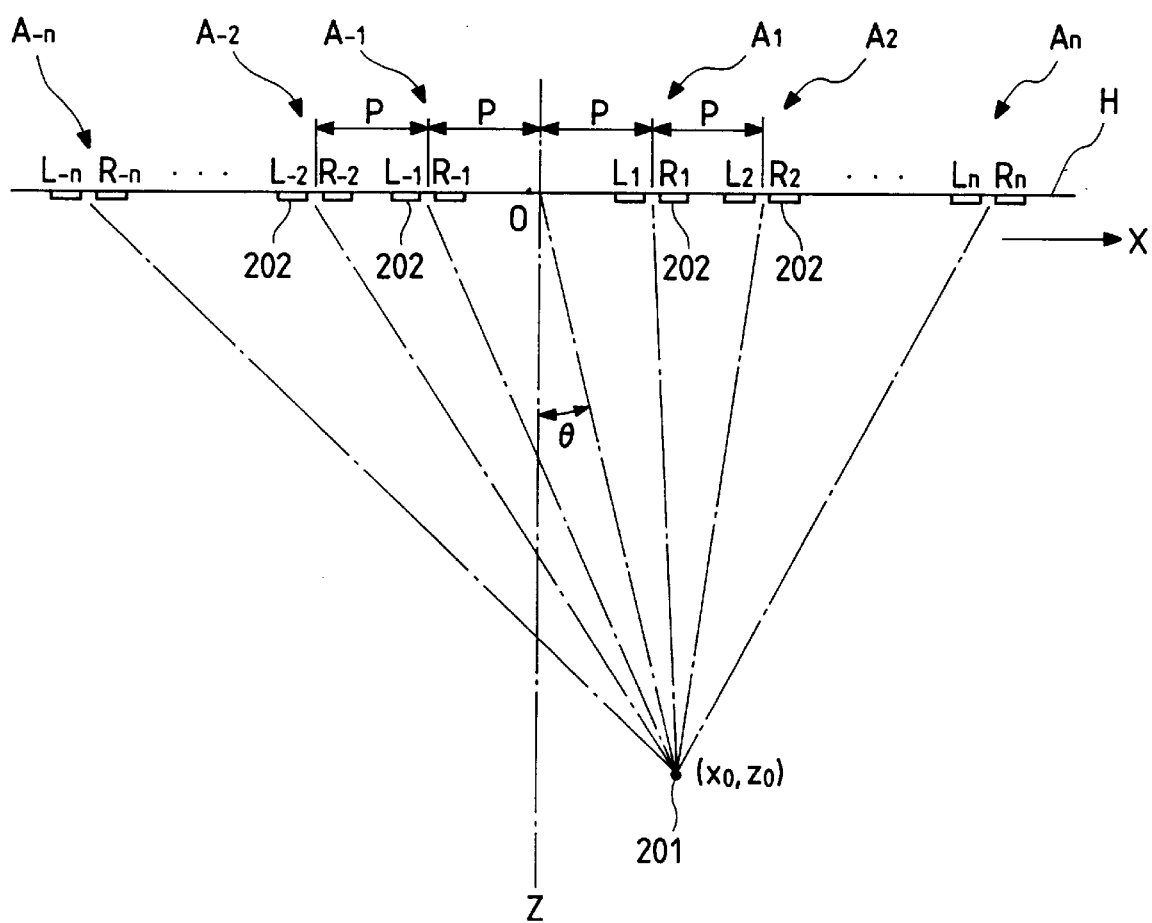
FIG. 31 is a plan showing an apparatus for position detection in two-dimensional coordinates where a plurality of paired detecting sections are provided.

In FIG. 31, the detecting sections $A_1$ and $A_{-1}$ are located at the distance P against the Z-axis (the origin 0 of the X-axis), and the subsequent pair of the detecting sections $A_2$ and $A_{-2}$ are located at the distance 2P against the Z-axis. Defining the pair number of the paired detecting sections as n, the distance between the nth pair of the paired detecting sections $A_n$ and $A_{-n}$ and the Z-axis is nP (n is an integer). In addition, at all detecting sections, divided light receiving portions 202 position on the same plane H. Further, in FIG. 31, though the iris member 204 having opening 203 in the size a is provided at the front of each divided light receiving portion 202, in FIG. 31, this illustration is omitted.

The values of $S_i$ and $T_i$ at each set of the paired detecting sections are equal to the values in the case that in the expression (19) and expression (20), i is set as 1, 2, 3, . . . N (in addition, $S_i$ has not the item i). Therefore, obtaining the values through cumulative addition of the values of $S_i$ and $T_i$ obtained at the sets of the paired detecting sections, and defining these as S and T, then, $$S = \sum_{i=1}^{n} S_i = (4d \cdot n/a)(x_0/z_0) \quad (21)$$

$$T = \sum_{i=1}^{n} T_i = -(2d \cdot n(n+1) \cdot p/a)(1/z_0)$$

is obtained. Using S and T obtained from the expression (21), the detecting precision of the moving light source 201 can be highly increased. Thus, obtaining the detection errors in the case a set of the paired detecting sections are used, and statistically calculating these as the detection errors of the plural sets of detecting sections, it is considered that this becomes the normal distribution. Defining the variance of the detection errors at a set of the detecting sections on the normal distribution as $\sigma_i^2$, the variance $\sigma^2$ in case of providing n sets of detecting sections is:

$$\sigma^2 = \sigma_i^2/n. \quad (22)$$

Thus, the more the set number n is, the smaller the detection error is.

In addition, in the embodiment in FIG. 31, though the distance between the 1st set of detecting sections A1 and A−1 and the origin 0 of the X-axis is P, the distance between the subsequent set of detecting sections A2 and A−2 and the 1st set of detecting sections A1 and A−1 is P, and hence, all detecting sections are aligned at the equal pitch, this pitch P can be optionally set according as the movement region of the moving light source 201. However, it is preferable to set the distance between the 1st set of detecting sections A1 and A−1 and the origin 0 of the X-axis as L that is longer than P, and to set the subsequent set of detecting sections and the succeeding sets as the equal pitch P. The calculation of S and T in this case becomes easy similarly to that in the expression (15).

Figure 32:
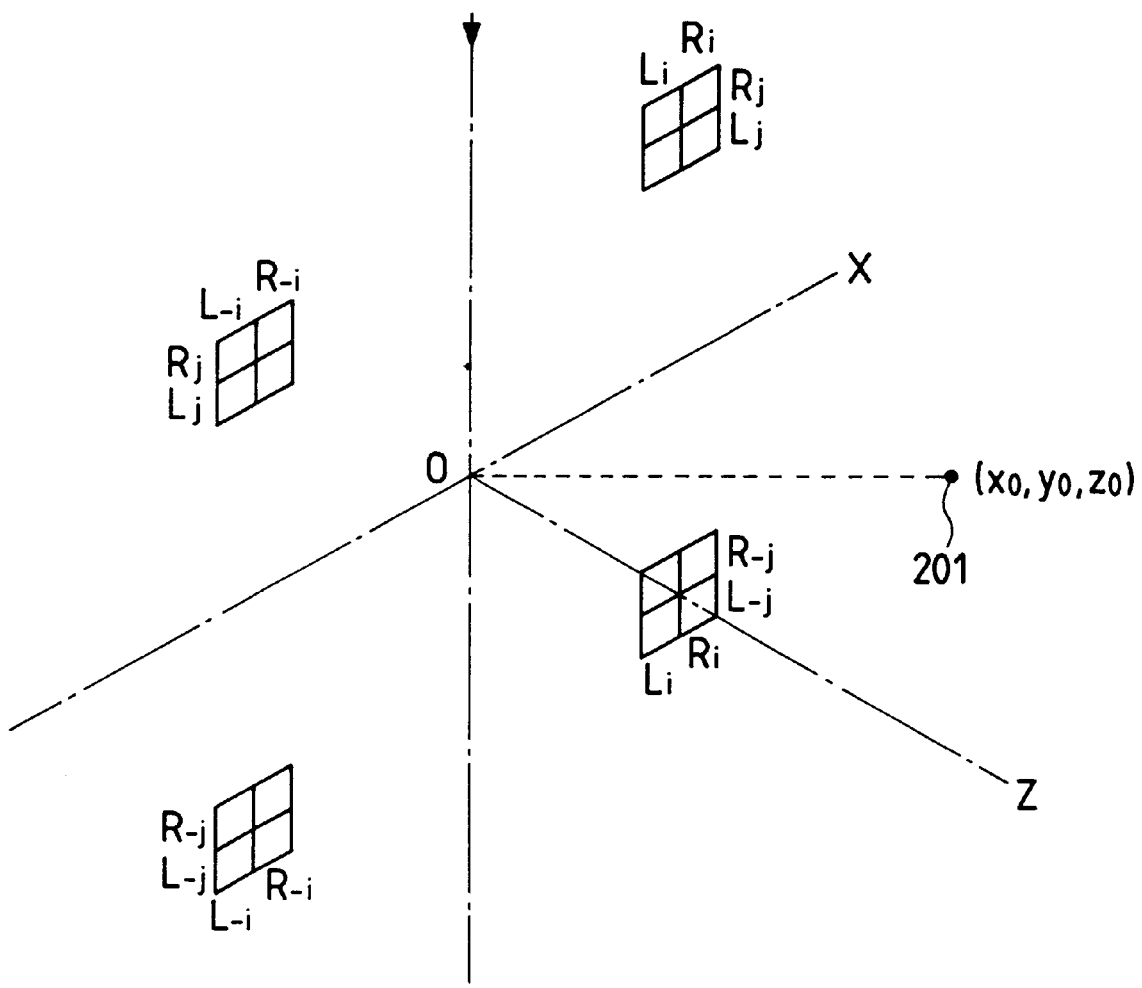
FIG. 32 is a perspective view showing an apparatus for position detection in three-dimensional coordinates.

In addition, in the above embodiment, though the moving light source 201 moves on the two-dimensional X-Z coordinates, as shown in FIG. 32, the movement position of the moving light source 201 similarly to that in the above embodiment in case the moving light source 201 moves on the three-dimensional X-Y-Z coordinates. Each detecting section in this case has a four-divided light receiving portion.

With the received light output Ri and Li, and R−i and L−i from the divided light receiving portions aligned toward the X-axis, the position of the moving light source 201 on the X-Z coordinates can be detected, with the received light output P and Lj, and R−j and L−j from the divided light receiving portions aligned toward the Y-axis, the position of the moving light source 201 on the Y-Z coordinates can be detected, and hence, the position of the moving light source 201 on the three-dimensional coordinates can be recognized. In this case, though the detecting section having the four-divided light receiving portion and the iris member is set as one set with four detecting sections, through providing plural sets aligned toward the X-Y plane, the further highly-precisional detection becomes possible.

With this detection of the moving light source on the three-dimensional coordinates, application to a three-dimensional input apparatus to a computer, and a virtual reality apparatus becomes possible.

As above described, the present invention can detect two-dimensionally the angle of a detecting section to a light source of reference light, and in addition, can detect the rotation angle of a detecting section against the Z-axis from the light received quantity at a light receiving portion.

Therefore, in case of an input of a position on the X-Y coordinates, correction of the rotation quantity of the X-Y coordinates at the time when the detecting section rotates can be performed. In addition, since the detection of the three-dimensional inclination angle is possible, application to virtual reality is possible.

In addition, in the present invention, since as for each signal group transmitted from a transmitting apparatus, a signal group including the inverted data and a signal group including the not inverted data are regularly repeated, the transfer time of each signal group is averaged as a whole. Therefore, since it becomes not necessary to provide, for example, the time margin for data processing of a receiving apparatus on the premise that the longest time of signal groups continue, data processing can be made efficient.

In addition, a signal group where coordinate data are the subject and a signal group that includes operation data are separated, the operation data are not transmitted when the coordinate data are transmitted as the subject, the signal group where the operation signal data are the subject is transmitted only when the operation signals are necessary, and hence, the transfer rate of the coordinate data can be increased, and the resolution of the coordinate input can be increased.

Further, since each of the high level and the low level of a signal is defined as a unit bit, and the sort of the binary signal is expressed with its time length, encoding can be made faster than a conventional one. For example, defining "1" of the binary signal as the time length 2T, the transfer rate can be made twofold of that of an conventional infrared transmission/reception.

What is claimed is:

1. A transmitting/receiving apparatus comprising a transmitting apparatus for transmitting phase-modulated signals per signal group with an interval, and a receiving apparatus having a waveform shaping block for performing waveform shaping of signals of each received said signal group, and a discriminator for discriminating "1" and "0" of a binary signal from the waveform-shaped signal, said transmitting/receiving apparatus, wherein a first signal group including data inverted "1" and "0" of the binary signal of data to be transferred and a second signal group including data not inverted are regularly repeated and transmitted from said transmitting apparatus and wherein each of a high level and a low level of said signals form a unit bit, and "1" or "0" of the binary signal is expressed by whether each bit is the unit bit or integer times of a unit time T representing a time length of each unit bit and wherein in each of said signal groups an inversion bit for showing whether a signal in said signal group is the signal inverted "1" and "0" of the binary signal of data to be transferred or not.

2. A transmitting/receiving apparatus recited in claim 1, wherein a transmitting apparatus is mounted on an input apparatus for inputting a coordinate position; a receiving apparatus is mounted on a main frame of the apparatus having a screen for displaying coordinates; as for signal groups transmitted from said transmitting apparatus, first signal groups where coordinate data are the subject and second signal groups where operation signal data are the subject are separated as different signal groups; said second signal groups where operation signal data are the subject are transmitted only when an operation member of the input apparatus is operated.

3. A transmitting/receiving apparatus recited in claim 2, wherein at the top of each signal group, a leader code composed of a high level and a low level is included, with a time length of the leader code, whether a signal in the signal group is a signal that coordinate data are the subject or a signal that operation signal data are the subject is distinguished.

4. A transmitting/receiving apparatus comprising a transmitting apparatus for transmitting phase-modulated signals, and a receiving apparatus having a waveform shaping block for performing waveform shaping of said received signals, and a discriminator for discriminating "1" and "0" of a binary signal from a time length of a high level and a time length of a low level of a signal which is shaped in a rectangular wave, said transmitting/receiving apparatus, wherein at said discriminator, whether each of a time length of a high level and a time length of a low level of a waveform-shaped rectangular signal are a unit time T or integer times of the unit time T is measured, each bit of a high level and a low level is defined as a unit bit, and "1" or "0" of a binary signal is discriminated per bit and wherein in a group of signals, a parity bit is provided, this parity bit expresses whether a sort "1" of a binary signal of each bit of a high level in a rectangular wave signal is even or odd, or whether a sort "1" of a binary signal of each bit of a low level is even or odd.

5. A transmitting/receiving apparatus recited in claim 4, wherein an integer magnification of said unit time is twice.

6. A transmitting/receiving apparatus recited in claim 5, wherein a bit count of a group of signals is odd, regarding each of a high level and a low level as a unit.

7. A transmitting/receiving apparatus recited in claim 4, wherein a bit count of a group of signals is odd, regarding each of a high level and a low level as a unit.

8. A transmitting/receiving apparatus recited in claim 4, wherein a bit count of a group of signals is odd, regarding each of a high level and low level as a unit.

9. A transmitting/receiving apparatus comprising a transmitting apparatus for transmitting phase-modulated signals, and a receiving apparatus having a waveform shaping block for performing waveform shaping of said received signals, and a discriminator for discriminating "1" and "0" of a binary signal from a time length of a high level and a time length of a low level of a signal which is shaped in a rectangular wave, said transmitting/receiving apparatus, wherein each of a high level and a low level of said signal forms a unit bit, "1" or "0" of the binary signal is expresses with whether each bit is the unit bit or integer times of a unit time T representing a time length of each unit bit, at said discriminator, a period of two unit bits such as succeeding bits of a high level and a low level or succeeding bits of a low level and a high level is measured, from a sort of the binary signal of the preceding bit in this period and said period, a sort of the binary signal of the succeeding bit in this period is discriminated.

10. A transmitting/receiving apparatus recited in claim 9, wherein a reference time length and a sort of the binary signal of a reference bit provided at a predetermined position of a signal are determined; through measuring a period with setting a starting position of the reference bit as a starting point, it is determined whether the binary signal of each of the preceding bit and the succeeding bit of this period is "0" or "1"; subsequently, through measuring a period with setting a starting position of the first bit as a starting point, a sort of the binary signal of the second bit is discriminated; and through repeating this, a sort of the binary signal of each bit is discriminated.

11. A transmitting/receiving apparatus recited in claim 10, wherein an inter magnification of a unit time is twice.

12. A transmitting/receiving apparatus recited in claim 10, wherein in a group of signals, a parity bit is provided, this parity bit expresses whether a sort "1" of a binary signal of each bit of a high level in a rectangular wave signal is even or odd, or whether a sort "1" of a binary signal of each bit of a low level is even or odd.

13. A transmitting/receiving apparatus recited in claim 10, wherein a bit count of a group of signals is odd, regarding each of a high level and a low level as a unit.

14. A transmitting/receiving apparatus recited in claim 9, wherein an integer magnification of said unit time is twice.

15. A transmitting/receiving apparatus recited in claim 9, wherein in a group of signals, a parity bit is provided, this parity bit expresses whether a sort "1" of a binary signal of each bit of a high level in a rectangular wave signal is even or odd, or whether a sort "1" of a binary signal of each bit of a low level is even or odd.

16. A transmitting/receiving apparatus recited in claim 9, wherein a bit count of a group of signals is odd, regarding each of a high level and a low level as a unit.

* * * * *

UNITED STATES PATENT AND TRADEMARK OFFICE
CERTIFICATE OF CORRECTION

PATENT NO.   : 5,963,194
DATED        : October 5, 1999
INVENTOR(S)  : Yuichi Umeda et al.

It is certified that error appears in the above-identified patent and that said Letters Patent is hereby corrected as shown below:

Title page,
Item [54], please change "APPARATUS FOR INCLINATION DETECTION AND INPUT APPARATUS USING THIS APPARATUS" to -- APPARATUS FOR INCLINATION DETECTION USING INVERTING BIT AND INPUT APPARATUS USING THIS APPARATUS --.

Column 30,
Lines 31-33, please delete claim 8 and renumber claims.
Line 43, please change "expresses" to -- expressed --.
Line 65, please change "inter" to -- integer --.

Signed and Sealed this

First Day of April, 2003

JAMES E. ROGAN
*Director of the United States Patent and Trademark Office*